United States Patent
Takahashi et al.

(10) Patent No.: US 9,846,714 B2
(45) Date of Patent: Dec. 19, 2017

(54) DATABASE DEVICE

(71) Applicant: KABUSHIKI KAISHA TOSHIBA, Minato-ku (JP)

(72) Inventors: Kenji Takahashi, Kawasaki (JP); Mototaka Kanematsu, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 321 days.

(21) Appl. No.: 14/611,368

(22) Filed: Feb. 2, 2015

(65) Prior Publication Data

US 2015/0227562 A1     Aug. 13, 2015

(30) Foreign Application Priority Data

Feb. 12, 2014 (JP) .................................. 2014-024518

(51) Int. Cl.
*G06F 17/30* (2006.01)

(52) U.S. Cl.
CPC .. *G06F 17/30321* (2013.01); *G06F 17/30292* (2013.01); *G06F 17/30404* (2013.01)

(58) Field of Classification Search
CPC ......... G06F 17/30321; G06F 17/30404; G06F 17/30292; G06F 12/00; G06F 17/30; G06F 17/30312; G06F 17/30386
See application file for complete search history.

(56) References Cited

U.S. PATENT DOCUMENTS

| | | | |
|---|---|---|---|
| 6,374,256 B1* | 4/2002 | Ng | G06F 9/4435 707/741 |
| 6,795,830 B1* | 9/2004 | Banerjee | G06F 17/30289 707/E17.005 |
| 2003/0126195 A1* | 7/2003 | Reynolds | G06F 1/14 709/203 |
| 2004/0177086 A1* | 9/2004 | Florkey | G06F 17/30569 707/E17.006 |

(Continued)

FOREIGN PATENT DOCUMENTS

| | | |
|---|---|---|
| JP | 2005-157718 | 6/2005 |
| JP | 2011-2905 | 1/2011 |
| JP | 2011-165148 | 8/2011 |

OTHER PUBLICATIONS

M. Shimamura et al., "Mounting and evaluation of an SQL accessing function in Key-Value Store type DBMS Design and implementation of SQL access feature on a key-value store DMBS" FIT2012 (the 11$^{th}$ information-science-and-technology forum), 2012, pp. 109-114 (with unedited computer generated English translation).

(Continued)

*Primary Examiner* — Anh Ly
(74) *Attorney, Agent, or Firm* — Oblon, McClelland, Maier & Neustadt, L.L.P.

(57) ABSTRACT

A KVS data processing unit, upon receiving a KVS type command of a database system in which index data and actual data are stored in a pair, manipulates data stored in a storage device based on said command. An SQL command (Continued)

execution unit, upon receiving an SQL command, serializes this command, generates KVS type data, and passes this data to the KVS data processing unit. A KVS command processing unit, upon receiving a KVS command, serializes this command, and transmits this data to the KVS data processing unit.

5 Claims, 24 Drawing Sheets

(56) References Cited

U.S. PATENT DOCUMENTS

| | | | | |
|---|---|---|---|---|
| 2004/0268306 | A1* | 12/2004 | Cheng | G06F 17/2247 717/114 |
| 2005/0198638 | A1* | 9/2005 | Bai | G06F 11/2069 718/100 |
| 2008/0016112 | A1* | 1/2008 | Reddy | G06F 9/4448 707/E17.01 |
| 2009/0319496 | A1* | 12/2009 | Warren | G06F 17/30427 707/E17.014 |
| 2010/0036653 | A1* | 2/2010 | Kim | G06F 17/289 704/3 |
| 2010/0185643 | A1* | 7/2010 | Rao | G06F 17/30389 707/759 |
| 2010/0188906 | A1* | 7/2010 | Johnson | G11C 5/00 365/189.05 |
| 2011/0202564 | A1 | 8/2011 | Kodaka et al. | |
| 2011/0271135 | A1* | 11/2011 | Kobashi | G06F 17/30377 713/600 |
| 2011/0276550 | A1* | 11/2011 | Colle | G06F 17/3056 707/705 |
| 2012/0067947 | A1* | 3/2012 | Fukuda | G06K 19/0723 235/380 |
| 2012/0131340 | A1* | 5/2012 | Teuwen | H04L 9/3278 713/168 |
| 2012/0284244 | A1* | 11/2012 | Kamimura | G06F 9/466 707/703 |
| 2013/0019000 | A1* | 1/2013 | Markus | G06F 9/466 709/223 |
| 2013/0217071 | A1* | 8/2013 | Montesclaros | C12P 19/34 435/91.2 |
| 2013/0250686 | A1* | 9/2013 | Marukame | G11C 16/08 365/185.12 |
| 2013/0275656 | A1* | 10/2013 | Talagala | G06F 12/0246 711/103 |
| 2013/0290234 | A1* | 10/2013 | Harris | G06N 5/022 706/46 |
| 2014/0012938 | A1* | 1/2014 | Ghandeharizadeh | H04L 67/2852 709/213 |
| 2014/0047227 | A1* | 2/2014 | Breternitz | G06F 9/5066 713/2 |
| 2014/0047342 | A1* | 2/2014 | Breternitz | G06F 9/5061 715/735 |
| 2014/0304525 | A1* | 10/2014 | Novak | H04L 63/061 713/193 |
| 2014/0372466 | A1* | 12/2014 | Wong | G06F 17/30427 707/760 |
| 2015/0100545 | A1* | 4/2015 | Ikegami | G06F 17/30557 707/609 |
| 2015/0309914 | A1* | 10/2015 | Eddington | G06F 8/51 717/124 |
| 2017/0139610 | A1* | 5/2017 | Choi | G06F 3/0611 707/E17.004 |

OTHER PUBLICATIONS

K. Sukenari et al., "the best for practical use of big data Scale-out type new database "InfoFrame Relational Store"", NEC science-and technology vol. 65-2, 2012, pp. 30-33, (with unedited computer generated English translation).

* cited by examiner

DATABASE DEVICE

CROSS REFERENCE TO RELATED APPLICATION

This application is based upon and claims the benefit of priority from Japanese Patent Application No. 2014-24518, filed on Feb. 12, 2014, the entire contents of which are incorporated herein by reference.

FIELD

Embodiments described in the present specification relate to a database device.

BACKGROUND

Big data which is large capacity digital data generated along with spread of the Internet or improvement in processing speed of computers, and so on, is receiving attention. Big data is not simply of large capacity, but is non-standard and has a high real-time nature. Since a conventional database management system standardizes data to store the data and then performs process analysis of the data, it has been regarded as difficult to handle big data having contradictory properties in such a conventional database management system. However, in recent years, technology capable of analyzing big data simply and at high speed has appeared, and it has become clear that utilizing big data makes it possible to discover new patterns or rules that until now have been unpredictable. Accordingly, there is an increasing demand for technology to perform large-scale data processing of big data, and so on, at high speed.

DETAILED DESCRIPTION

Figure 1:
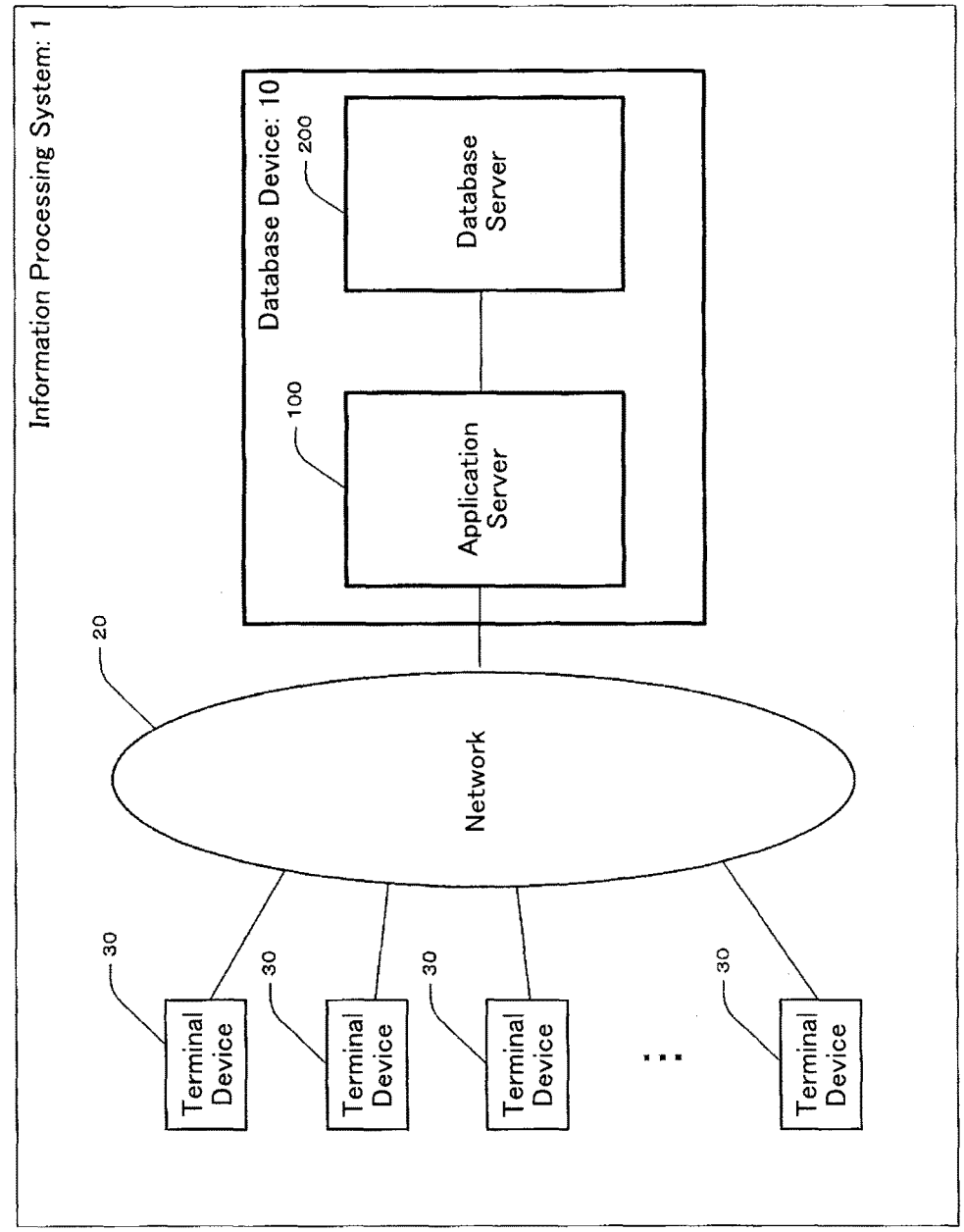
FIG. 1 is a functional block diagram showing a configuration example of an information processing system including a database device according to a first embodiment.

An embodiment of the present invention is proposed as a database device. This database device includes a storage device, a data processing device, a second command execution device, a first command processing device, and an interface device.

The storage device stores data by a database system in which index data and actual data are stored in a pair.

The data processing device, upon receiving a first command described in a first database language which is a database language for the database system in which index data and actual data are stored in a pair, manipulates data stored in the storage device based on said first command.

The second command execution device, upon receiving a second command described in a second database language which is a database language different from the first database language, serializes this second command, generates data configured from index data and actual data, and passes this data to the data processing device.

The first command processing device, upon receiving the first command described in the first database language, serializes the first command, generates data configured from index data and actual data, and transmits this data to the data processing device.

The interface device, in the case of having received the first command described in the first database language from an application, passes this first command to the first command processing device, and upon receiving the second command described in the second database language, transmits said second command to the second command execution device.

Database devices according to embodiments of the present invention will be described below with reference to the drawings.

0. DEFINITIONS OF TERMS

Definitions of terms used in the present specification will be mentioned.

[0.1. Database Language]

A "database language" refers to a computer language for handling a database.

[0.2. SQL]

An "SQL" refers to a database language (query language) for performing manipulation or definition of data, in a relational database management system (RDBMS). An SQL is mainly used in a relational database.

[0.3. KVS (Key Value Store)]

"KVS (Key Value Store)" refers to a database system in which index data representing a Key and actual data representing a Value are stored in a pair. A search by Key can be executed at high speed.

[0.4. Table Schema Information]

"Table schema information" refers to information relating to structure of a table, such as each field name or attribute, which is specified, for example, during table creation, in a database.

[0.5. Serialization]

"Serialization" refers to processing that converts multiple data such as text or numerical values to one character string.

[0.6. Deserialization]

"Deserialization" refers to processing that returns serialized data to original multiple data.

1. FIRST EMBODIMENT

A first embodiment of the present invention is proposed as a database device. This database device is a device that comprises a plurality of data manipulation means, namely, an SQL and a KVS-API. This database device solves a problem of the SQL that speed is slow by the KVS-API, and can manipulate also by the SQL which is frequently used in existing applications. The KVS-API corresponds to a first database language of the present embodiment, and the SQL corresponds to a second database language of the present embodiment.

The database device is an information processing device such as a computer, a work station, a server, and so on, and this information processing device is a device provided with an arithmetic processing unit (CPU), a main memory (RAM), a read only memory (ROM), an input/output device (I/O), and when necessary an external memory device such as a hard disk device, and so on.

[1.1. Configuration Example]

A configuration of a database device according to an embodiment of the present invention will be described. FIG. 1 is a functional block diagram showing a configuration example of an information processing system including the database device according to the present embodiment. An information processing system 1 includes a database device 10 and a terminal device 30 connectable to the database device 10 via a network 20.

The terminal device 30 is an information processing device such as a personal computer, a tablet computer, a portable terminal, and so on, and may be any device provided the device is capable of communication with the database device 10. The terminal device 30 transmits a processing request such as search of data, registration of data, and update of data to the database device 10, via the network, and receives a result of processing performed by the database device 10 based on this processing request, via the network.

The database device 10 includes an application server 100 and a database server 200 connected to the application server 100. Note that the configuration example shown in FIG. 1 is illustrated as a configuration in which the application server 100 and the database server 200 are connected via an exclusive communication line, not via the network 20, but it is also possible to adopt a configuration in which they are connected via the network 20 or a network different from the network 20.

Figure 2:
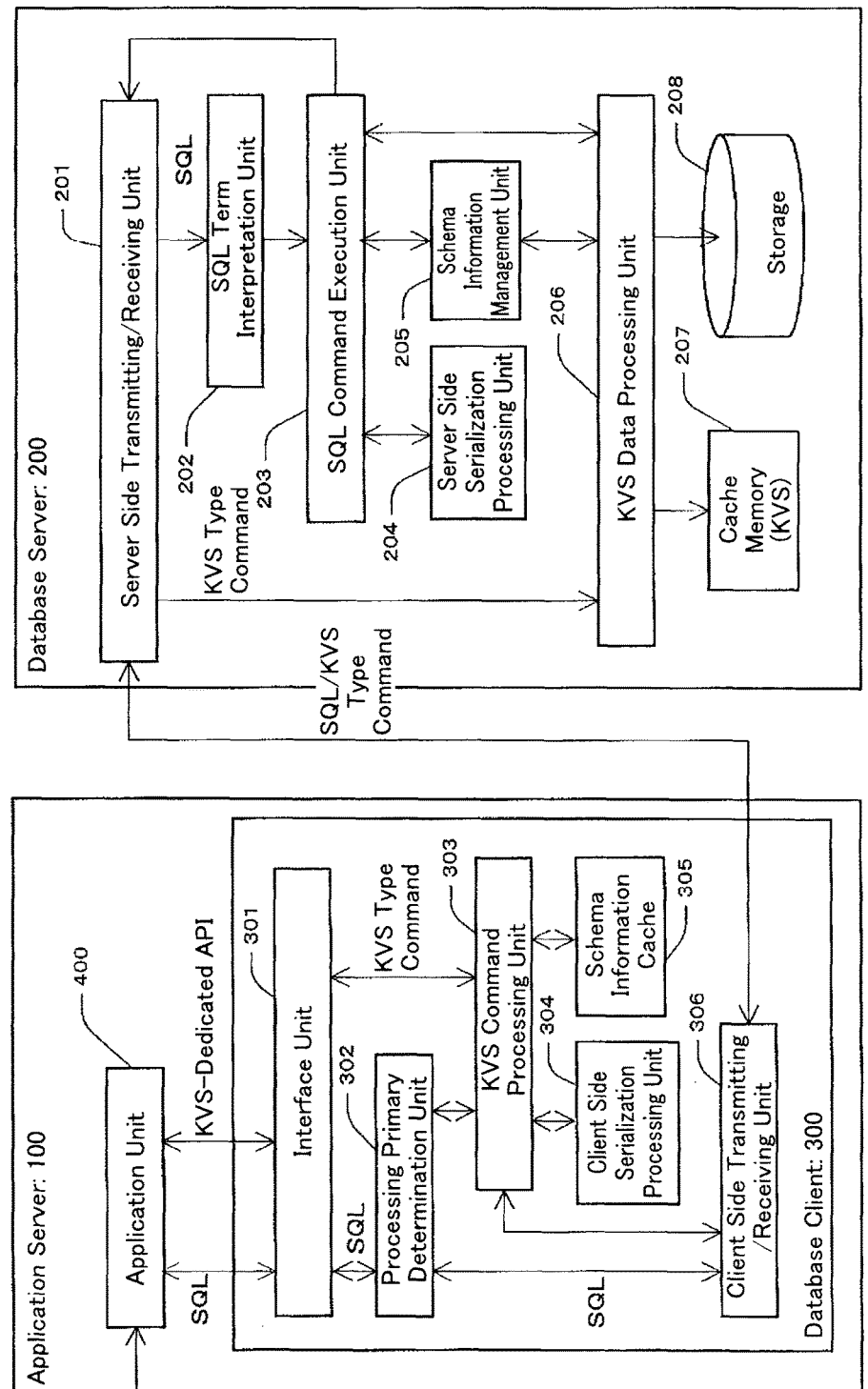
FIG. 2 is a functional block diagram of a configuration example of the database device.

FIG. 2 displays a functional block diagram showing a configuration example of the database device 10. Note that configuration elements shown in the functional block diagram are treated as blocks grouping functions of the database device on a function basis and does not mean that the database device must comprise physical configuration elements such as a substrate, a device, a circuit, a component, and so on, corresponding to each configuration element. Moreover, "connection" refers to being in a state enabling transmitting and/or receiving, accepting, passing on, and so on, of data, information, instructions, and so on, and does not have a meaning limited to physical connection such as being mutually connected by a wiring line. The same applies also to descriptions of other functional block diagrams of configuration elements in the present specification.

The database device according to the embodiment of the present invention includes the application server 100 and the database server 200 connected to the application server 100. The application server 100 is connected to the network 20 and is capable of communication with the terminal device 30 via the network 20.

[1.1.1. Application Server]

The application server 100 utilizes a database provided by the database server 200 to function providing a service to the terminal device 30.

The application server 100 includes an application unit 400 and a database client 300 connected to the application unit 400.

The application unit 400 invokes a KVS-API or generates SQL text based on a processing request received from the terminal device 30.

The database client 300, upon receiving an invocation of the KVS-API from the application unit 400, executes a serialization of data passed on from the application unit 400, and generates a KVS type command including post-serialization data to be transmitted to the database server 200. Moreover, the database client 300, upon receiving SQL text from the application unit 400, determines whether that SQL text is simple SQL text or not, and in the case of determining that SQL text to be simple SQL text, generates a KVS type command based on that SQL text to be transmitted to the database server 200, while, in the case of determining that SQL text not to be simple SQL text, sends that SQL text to the database server 200.

[1.1.1.1. Database Client]

A configuration example of the database client 300 will be described with reference to FIG. 2. The database client 300 includes: an interface unit 301; a processing primary determination unit 302 that is connected to the interface unit 301; a client side transmitting/receiving unit 306 and a KVS type command processing unit 303 that are connected to the processing primary determination unit 302; and a client side serialization processing unit 304 and a schema information cache 305 that are connected to the KVS type command processing unit 303. Note that the interface unit 301 is connected to the application unit 400, and the client side transmitting/receiving unit 306 is connected to a later-mentioned server side transmitting/receiving unit 201.

The interface unit 301 receives SQL text or a KVS-API invocation from the application unit 400, and in the case where received content is SQL text, passes that SQL text to the processing primary determination unit 302, while in the case where received content is a KVS-API invocation, generates a KVS type command from the KVS-API invocation to pass on this KVS type command to the KVS type command processing unit 303. The interface unit 301 corresponds to an interface device of the present embodiment.

The KVS type command processing unit 303 acquires table schema information from the schema information cache 305, passes the table schema information and the KVS type command to the client side serialization processing unit 304, and generates a KVS type command including the serialized data. The KVS type command processing unit 303 corresponds to a first command processing device of the present embodiment.

The client side serialization processing unit 304 serializes a plurality of elements (numerical values, character strings, and so on) included in the received KVS type command, with reference to table schema information stored in the schema information cache 305, and outputs a KVS type command after serialization has been performed.

The processing primary determination unit 302 determines whether SQL text received from the interface unit 301 is simple SQL text or not, and in the case of determining that SQL text to be simple SQL text, generates a KVS type command based on that SQL text and passes that KVS type command to the KVS type command processing unit 303, while in the case of determining the received SQL text not to be simple SQL text, passes that SQL text to the client side transmitting/receiving unit 306. The processing primary determination unit 302 corresponds to a determination device of the present embodiment.

The "simple SQL text" referred to here is basically determined by a standard of whether there exists a KVS-API that performs an equivalent processing or not. An SQL text for which there exists a KVS-API that performs an equivalent processing is a "simple SQL text".

Note that an example of a simple SQL text is an SQL text such as "SELECT * FROM table1", and an example of an SQL text which is not simple is "SELECT * FROM table1 WHERE value>20;".

The client side transmitting/receiving unit 306 cooperates with the later-described server side transmitting/receiving unit 201 to perform transmitting/receiving of data.

[1.1.1.2. Database Server]

The database server 200 executes registration, acquisition, deletion, update, and so on, of data to the database, based on a request of the database client 300. The database server 200 can handle both of KVS-API and SQL. The database server 200 serializes and deserializes parameters of SQL. The database server 200 serializes data and stores it in a record unit in KVS format.

The database server 200 includes: the server side transmitting/receiving unit 201; an SQL term interpretation unit 202 that is connected to the server side transmitting/receiving unit 201; an SQL command execution unit 203 that is connected to the SQL term interpretation unit 202; a KVS data processing unit 206, a server side serialization processing unit 204, and a schema information management unit 205 that are connected to the SQL command execution unit 203; and a cache memory 207 and a storage 208 that are connected to the KVS data processing unit 206. The KVS data processing unit 206 and the SQL command execution unit 203 are connected to the server side transmitting/receiving unit 201. The server side transmitting/receiving unit 201 is connected to the client side transmitting/receiving unit 306.

The server side transmitting/receiving unit 201 cooperates with the previously described client side transmitting/receiving unit 306 to perform transmitting/receiving of data.

The SQL term interpretation unit 202 analyzes text data which is SQL text to output a syntax tree.

The SQL command execution unit 203 executes an SQL command included in the syntax tree outputted from the SQL term interpretation unit 202, and outputs an execution result. This SQL command execution unit 203 converts the SQL command into a KVS type command to be passed to the KVS type data processing unit. The SQL command execution unit 203 corresponds to a second command execution device of the present embodiment.

The server side serialization processing unit 204 extracts elements corresponding to Key and Value from the SQL text, and generates and outputs KVS format data which is serialized data, corresponding to said SQL text.

The schema information management unit 205 stores table schema information such as each field name or attribute of the table stored in the storage 208 and the cache memory 207, and if a configuration of the table has been changed, updates to post-change table schema information.

The KVS data processing unit 206 performs registration, update, change, and deletion of data in the storage 208 or the cache memory 207 based on the KVS type command, and reads data matching specified conditions from the storage 208 or the cache memory 207. The KVS data processing unit 206 corresponds to a data processing device of the present embodiment.

The storage 208 stores a table configured from KVS type data in a nonvolatile manner.

The cache memory 207 temporarily stores all or part of the table configured from the KVS type data.

[1.2. Specific Example of Data Registration Flow of Each of KVS-API and SQL]

Specific examples of data registration flow of each of KVS-API and SQL will be shown below.

[1.2.1. Data Registration of KVS-API]

An example where the application unit 400 has passed the following message to the database client 300 as a KVS-API, will be related.

set tbl1 "coffee", 280, 1126, "drink"

The database client 300, more specifically the client side serialization processing unit 304 that has received the above-described message executes serialization of data in the above-described message, such that this data can be stored in KVS format by the database server 200.

Serialization of the data is performed employing a certain rewriting rule. An example of the rewriting rule is shown below.

(1) When data is an integer, it is rewritten as "i***" (where * is a numeral)

(2) When data is a character string, it is rewritten as "t number of characters-***" (where * is a character)

Note that an attribute of the data is determined referring to the table schema information stored in the schema information cache 305.

Data serialized by rewriting the above-described "set tbl1 "coffee", 280, 1126, "drink"" according to this rewriting rule, becomes as follows.

set tbl1 "coffee", "i280i1126t5-drink"

The database client 300 transmits the serialized data to the database server 200, and the database server 200 stores the serialized data.

In the above-described serialized data, "coffee" is the Key and "i280i1126t5-drink" is the Value. The database server 200 stores a table which is a set of records in which the above-described kinds of Key and Value are formed in pairs.

An example of the table is shown below.

| "Key" | "Value" |
|---|---|
| coffee | i280i1126t5-drink |
| tea | i280i1024t5-drink |
| pasta | i800i0543t4-food |

[1.2.2. Data Registration of SQL]

An example where content identical to the above-described "set tbl1 "coffee", 280, 1126, "drink"" is registered in the database server 200 using SQL, is shown.

The application unit 400 passes the SQL command below to the database client 300.
INSERT INTO tbl1 VALUES ('coffee', 280, 1126, 'drink');

The database client 300 that has received the above-described SQL command determines whether this SQL command is processable at high speed or not, and in the case of determining that high speed processing is not possible, transmits this SQL command unchanged to the database server 200.

The database server 200 that has received the above-described SQL command serializes data included in the SQL command to generate a record configured from a pair of a Key and a Value, and stores this record. Serialization of the data is performed employing a certain rewriting rule, and the rewriting rule is identical to the rewriting rule employed for the KVS-API.

Data having the above-described SQL command serialized using the rewriting rule, becomes as follows.
"coffee", "i280i1126t5-drink"

This data has identical content to the serialized data generated in the case of KVS-API.

The database server 200 performs data registration by adding the above-described data to the table as one record.

2. OPERATION EXAMPLE

Operation of the database device according to the present embodiment will be described.

[2.2. Table Creation Processing]

Figure 3:
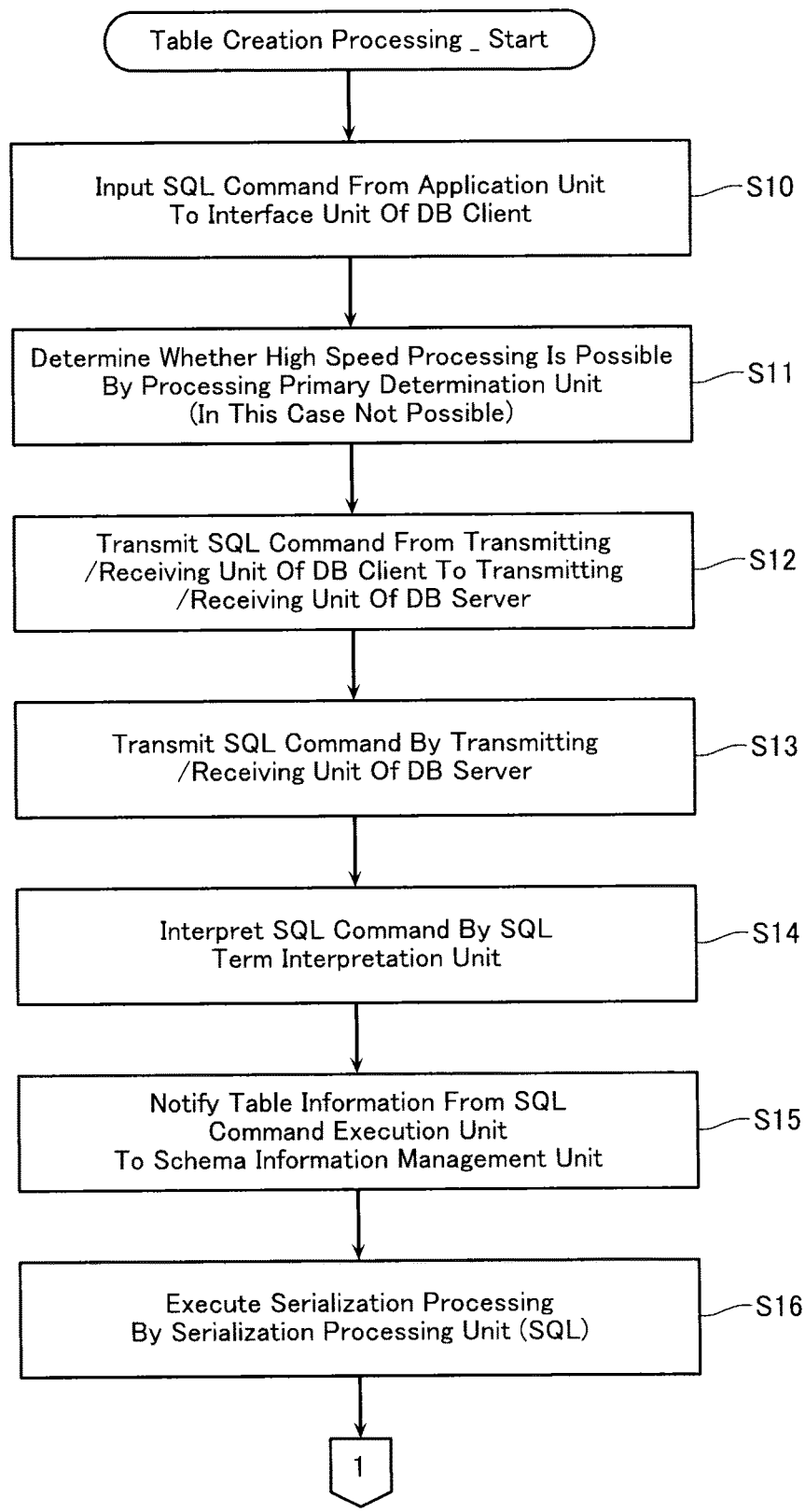
FIG. 3 is a flowchart showing one example of table creation processing.
Figure 4:
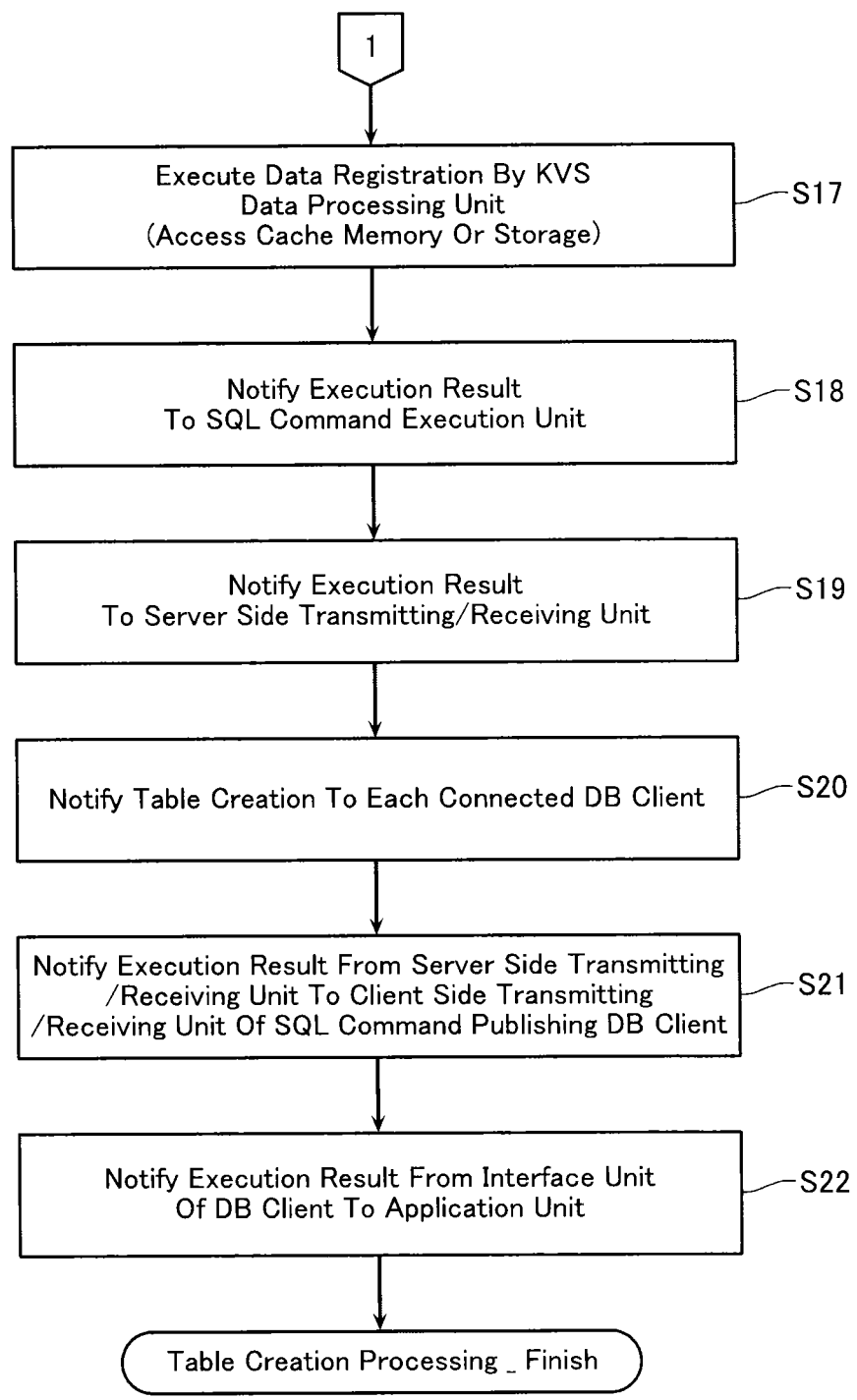
FIG. 4 is a flowchart continuing from the flowchart of FIG. 3.

Table creation processing executed by the database device will be described. Table creation processing is processing that newly creates a table in the database server 200, and stores this table. FIG. 3 is a flowchart showing one example of table creation processing, and FIG. 4 is a flowchart continuing from the flowchart of FIG. 3. Table creation processing will be described below with reference to these flowcharts.

In table creation processing, first, the database device 10, more specifically the application unit 400 inputs an SQL command into the interface unit of the database client 300 (S10).

Next, the database device 10, more specifically the interface unit 301 passes the received SQL command to the processing primary determination unit 302, and the processing primary determination unit 302 determines whether high speed processing of this SQL command is possible (S11). In this description, the following description is given assuming that high speed processing has been determined to be not possible. Note that the previously mentioned "simple SQL text" is determined to be processable at high speed, and the case of not being "simple SQL text" is determined to be not processable at high speed.

The processing primary determination unit 302 that has determined that high speed processing is not possible passes this SQL command to the client side transmitting/receiving unit 306.

Next, the database device 10, more specifically the client side transmitting/receiving unit 306 of the database client 300 transmits the SQL command to the server side transmitting/receiving unit 201 of the database server 200 (S12).

Next, the database device 10, more specifically the server side transmitting/receiving unit 201 of the database server 200 receives the SQL command from the client side transmitting/receiving unit 306 (S13).

Next, the database device 10, more specifically the server side transmitting/receiving unit 201 passes the SQL command to the SQL term interpretation unit 202. The SQL term interpretation unit 202 that has received the SQL command interprets this SQL command and passes an interpretation result to the SQL command execution unit 203 (S14).

Next, the database device 10, more specifically the SQL command execution unit 203 generates table schema information from the interpretation result of the SQL command and passes this to the schema information management unit 205 (S15).

Next, the database device 10, more specifically the SQL command execution unit 203 extracts the Key and the Value of data to be registered in the table, from the interpretation result of the SQL command, and passes these to the server side serialization processing unit 204. The server side serialization processing unit 204 performs serialization processing on the received Key and Value and generates KVS data which is serialized data to be returned to the SQL command execution unit 203 (S16). The SQL command execution unit 203 that has received the KVS data passes this KVS data to the KVS data processing unit 206.

The database device 10, more specifically the KVS data processing unit 206 stores the received KVS data in the cache memory 207 or the storage 208 and executes data registration (S17).

When the above-described data registration is completed, the database device 10, more specifically the KVS data processing unit 206 notifies an execution result to the SQL command execution unit 203 (S18).

Next, the database device 10, more specifically the SQL command execution unit 203 notifies the execution result to the server side transmitting/receiving unit 201 (S19).

Next, the database device 10, more specifically the server side transmitting/receiving unit 201 notifies table creation to each database client 300 that is connected (S20).

In addition, the database device 10, more specifically the server side transmitting/receiving unit 201 notifies the execution result to the client side transmitting/receiving unit 306 of the database client 300 that is a publisher of the SQL command (S21). The client side transmitting/receiving unit 306, upon receiving the execution result, notifies this execution result to the interface unit 301.

The database device 10, more specifically the interface unit 301 of the database client 300 notifies the execution result to the application unit 400 (S22). The application unit 400 is informed that table registration has been completed based on the SQL command that it itself issued.

That concludes table registration processing.

Figure 5:
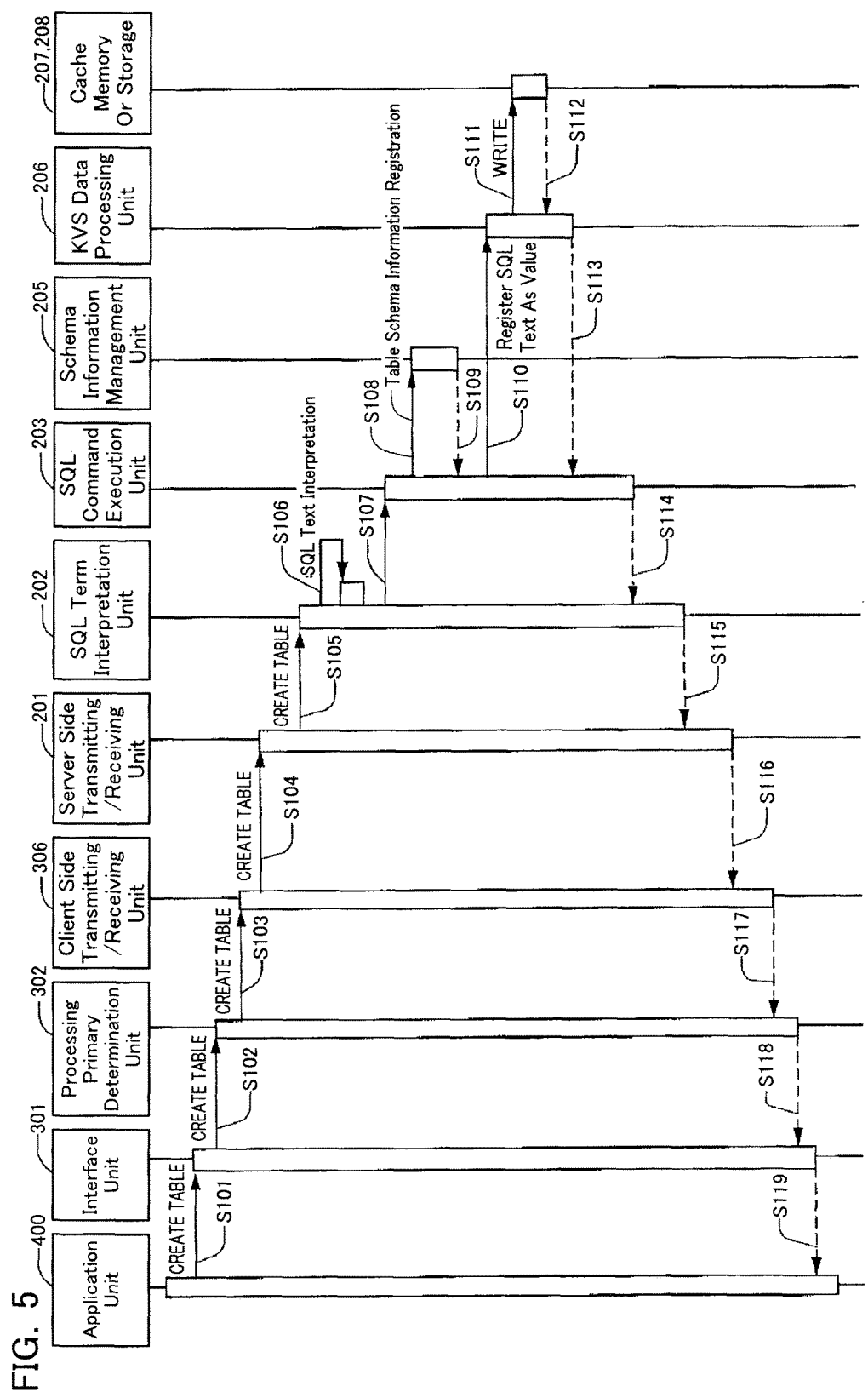
FIG. 5 is a sequence diagram of the table creation processing corresponding to the flowcharts of FIGS. 3 and 4.

FIG. 5 shows a sequence diagram of the table creation processing corresponding to the above-described flowcharts of FIGS. 3 and 4.

When the application unit 400 transmits an SQL command "CREATE TABLE" to the interface unit 301 of the database client 300 (S101), the interface unit 301 transmits this SQL command "CREATE TABLE" to the processing primary determination unit 302 (S102), and the processing primary determination unit 302 transmits it to the client side transmitting/receiving unit 306 (S103). The client side transmitting/receiving unit 306 transmits this SQL command "CREATE TABLE" to the server side transmitting/receiving unit 201 of the database server 200 (S104).

The server side transmitting/receiving unit 201 of the database server 200 that has received this SQL command "CREATE TABLE" transmits the SQL command "CREATE TABLE" to the SQL term interpretation unit 202 (S105).

The SQL term interpretation unit S202 that has received the SQL command "CREATE TABLE" executes term interpretation of the SQL command "CREATE TABLE" (S106) and transmits a table creation execution instruction to the SQL command execution unit 203 based on a result of term interpretation (S107).

The SQL command execution unit 203 that has received the table creation execution instruction generates table schema information from the table creation execution instruction and transmits this table schema information to the schema information management unit 205 (S108).

The schema information management unit 205 that has received the table schema information stores this table schema information and notifies to the SQL command execution unit 203 that storage of the table schema information has been performed (S109).

The SQL command execution unit 203 that has received notification that storage of the table schema information has been performed transmits to the KVS data processing unit 206 a request to register serialized data generated in the server side serialization processing unit 204 (S110).

The KVS data processing unit 206 that has received the previously mentioned request transmits to the cache memory 207 or the storage 208 a request to store the serialized data (S111). The cache memory 207 or the storage 208 stores the serialized data based on this request. The cache memory 207 or the storage 208 that has completed storage of the data transmits to the KVS data processing unit 206 a notification that registration of data has been completed (S112). The KVS data processing unit 206 transmits to the SQL command execution unit 203 the notification that registration of data has been completed (S113).

This notification that registration of data has been completed is transmitted to the application unit 400 via, sequentially, the SQL term interpretation unit 202, the server side transmitting/receiving unit 201, the client side transmitting/receiving unit 306, the processing primary determination unit 302, and the interface unit 301 (S114 to S119).

That concludes table creation processing.

[2.2. Table Contents Change Notification Processing]

Figure 6:
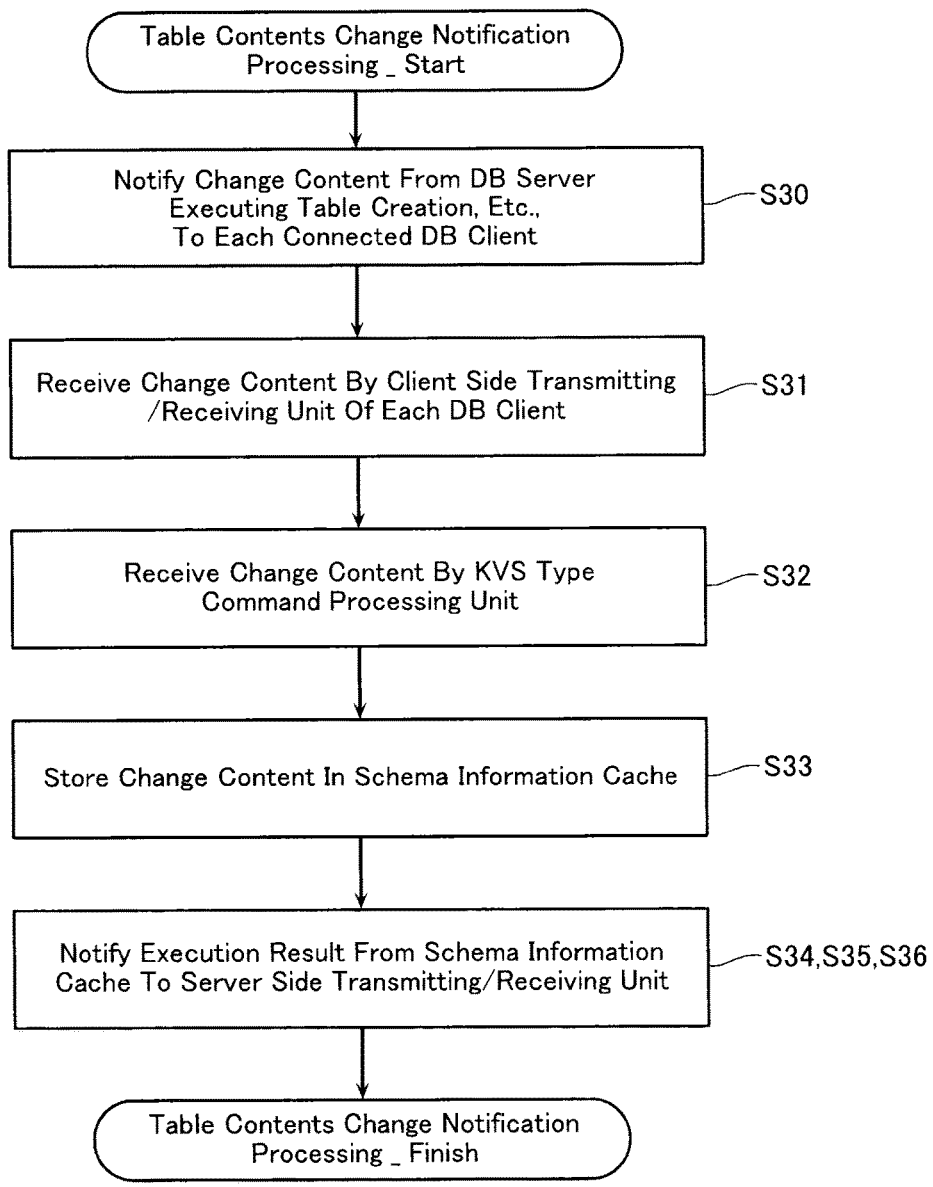
FIG. 6 is a flowchart showing one example of table contents change notification processing.
Figure 7:
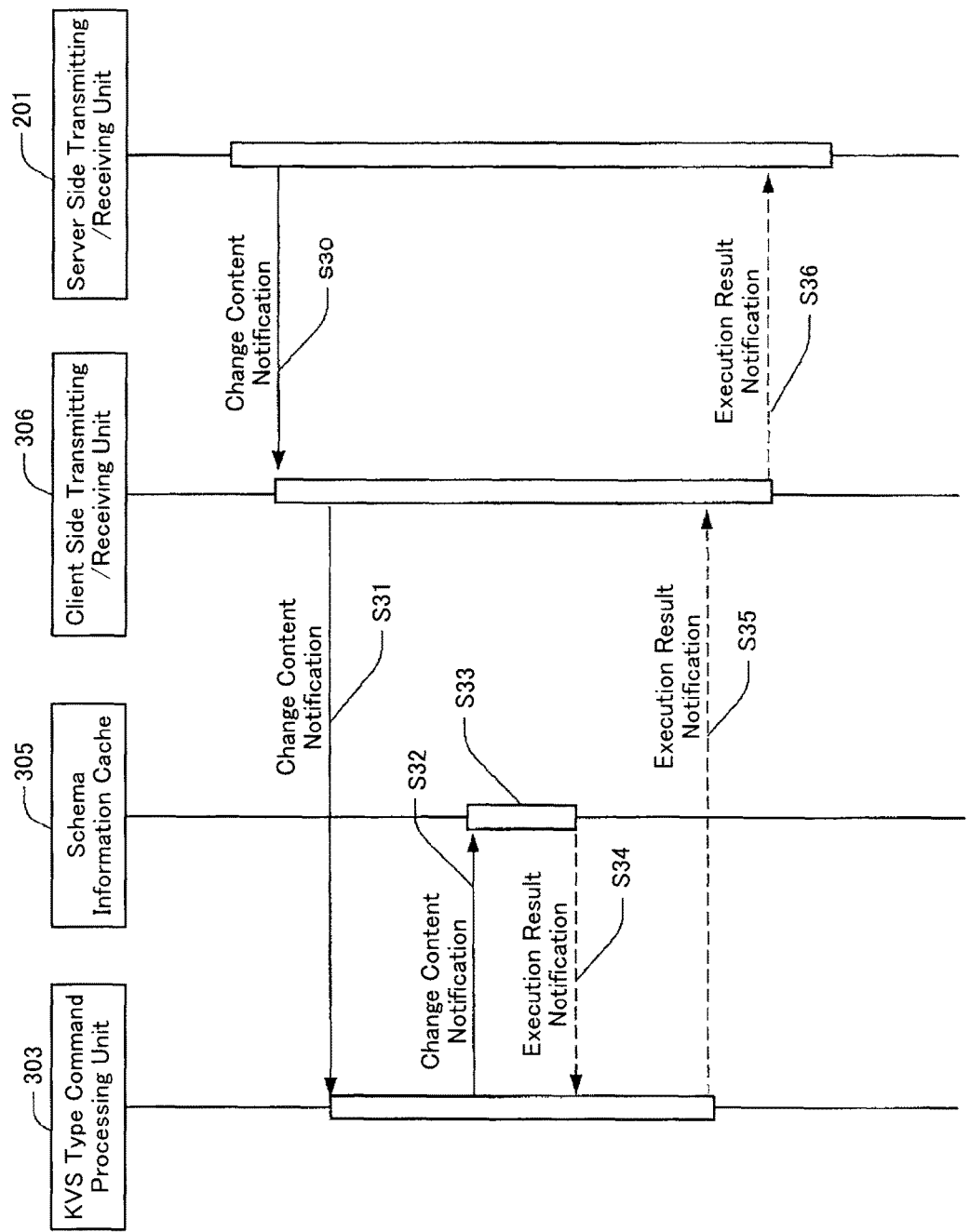
FIG. 7 is a sequence diagram of the table contents change notification processing corresponding to the flowchart of FIG. 6.

Table contents change notification processing which is processing that notifies from the database server 200 to the database client 300 when there has been a change in the likes of table content of the database device 10, will be described. FIG. 6 is a flowchart showing one example of table contents change notification processing. Moreover, FIG. 7 shows a sequence diagram of the table contents change notification processing corresponding to the above-mentioned flowchart of FIG. 6. Table contents change notification processing will be described below with reference to FIGS. 6 and 7.

When a change in table content occurs, the database server 200 that executed table creation, and so on, transmits to each database client 300 that is connected a message notifying change content (S30).

The database device 10, more specifically the client side transmitting/receiving unit 306 of the database client 300 receives the above-described message notifying change content (S31).

The client side transmitting/receiving unit 306 passes to the KVS command processing unit 303 the message notifying change content, and the KVS command processing unit 303 acquires the message notifying change content (S32).

The KVS command processing unit 303 that has acquired the message notifying change content stores the change content in the schema information cache 305 (S33).

Subsequently, an execution result is transmitted from the schema information cache 305 to the server side transmitting/receiving unit 201 via the KVS command processing unit 303 and the client side transmitting/receiving unit 306 (S34, S35, and S36).

That concludes table contents change notification processing.

[2.3. Table Deletion Processing]

Figure 8:
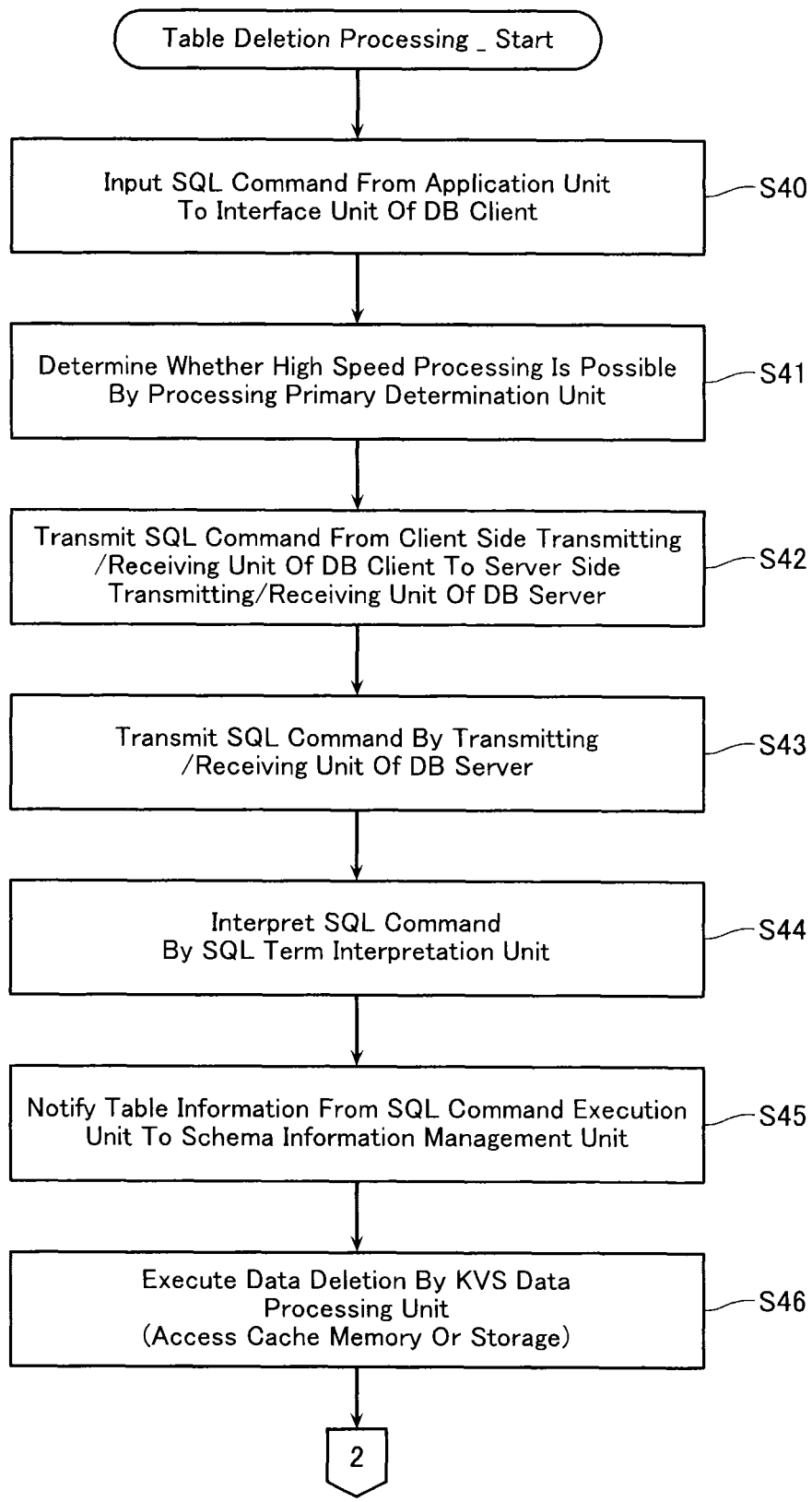
FIG. 8 is a flowchart showing one example of table deletion processing.
Figure 9:
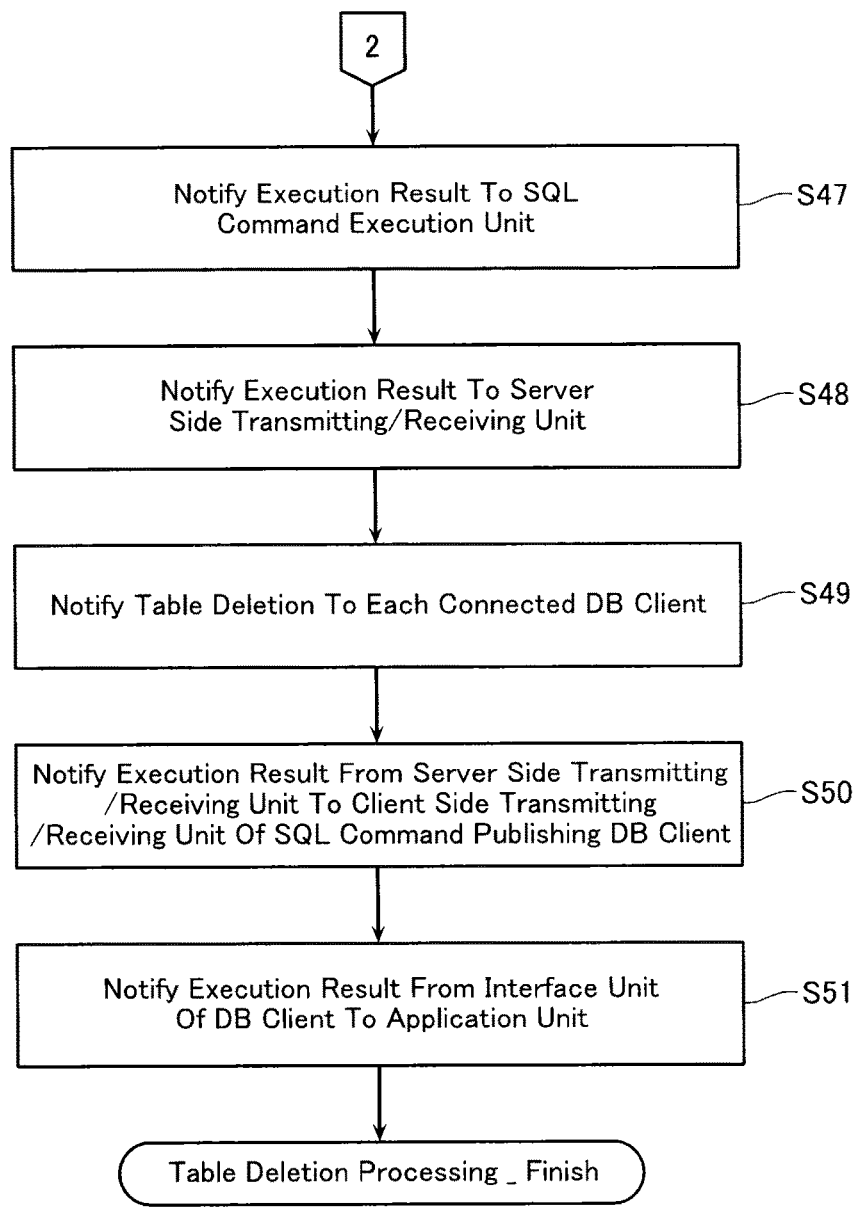
FIG. 9 is a flowchart continuing from the flowchart of FIG. 8.

Table deletion processing executed by the database device 10 will be described. Table deletion processing is processing that deletes the table from the database server 200. FIG. 8 is a flowchart showing one example of table deletion processing, and FIG. 9 is a flowchart continuing from the flowchart of FIG. 8. Table deletion processing will be described below with reference to these flowcharts.

In the table deletion processing, first, the database device 10, more specifically the application unit 400 inputs into the interface unit 301 of the database client 300 an SQL command "DROP TABLE" requesting table deletion (S40).

Next, the database device 10, more specifically the interface unit 301 passes the received SQL command "DROP TABLE" to the processing primary determination unit 302, and the processing primary determination unit 302 determines whether high speed processing of this SQL command is possible (S41). In this description, the following description is given assuming that high speed processing has been determined to be not possible. Note that the previously mentioned "simple SQL text" is determined to be processable at high speed, and the case of not being "simple SQL text" is determined to be not processable at high speed.

Note that in the case where it has been determined in step S41 that high speed processing is possible, the processing primary determination unit 302 generates a KVS type command corresponding to said SQL command, passes this KVS type command to the KVS command processing unit 303, and executes said KVS type command.

Now, the processing primary determination unit 302 that has determined in step S41 that high speed processing is not possible passes this SQL command "DROP TABLE" to the client side transmitting/receiving unit 306. Next, the database device 10, more specifically the client side transmitting/receiving unit 306 of the database client 300 transmits the SQL command "DROP TABLE" to the server side transmitting/receiving unit 201 of the database server 200 (S42).

Next, the database device 10, more specifically the server side transmitting/receiving unit 201 of the database server 200 receives the SQL command "DROP TABLE" from the client side transmitting/receiving unit 306 (S43).

Next, the database device 10, more specifically the server side transmitting/receiving unit 201 passes the SQL command "DROP TABLE" to the SQL term interpretation unit 202. The SQL term interpretation unit 202 that has received the SQL command "DROP TABLE" interprets this SQL command "DROP TABLE" and passes an interpretation result to the SQL command execution unit 203 (S44).

Next, the database device 10, more specifically the SQL command execution unit 203 generates table schema information from the interpretation result of the SQL command and passes this to the schema information management unit 205 (S45).

Next, the database device 10, more specifically the SQL command execution unit 203 requests table deletion to the KVS data processing unit 206, and the KVS data processing unit 206 accesses the cache memory 207 or the storage 208 to execute table deletion (S46).

When the above-described data deletion is completed, the database device 10, more specifically the KVS data processing unit 206 returns an execution result to the SQL command execution unit 203 (S47).

Next, the database device 10, more specifically the SQL command execution unit 203 passes the execution result to the server side transmitting/receiving unit 201 (S48).

Next, the database device 10, more specifically the server side transmitting/receiving unit 201 transmits a notification of table deletion to the client side transmitting/receiving unit 306 of each database client 300 that is connected (S49).

In addition, the database device 10, more specifically the server side transmitting/receiving unit 201 transmits the execution result to the client side transmitting/receiving unit 306 of the database client 300 that is a publisher of the previously mentioned SQL command "DROP TABLE" (S50). The client side transmitting/receiving unit 306, upon receiving the execution result, passes this execution result to the interface unit 301.

The database device 10, more specifically the interface unit 301 of the database client 300 notifies the execution result to the application unit 400 (S51). The application unit 400 is informed that table deletion has been completed based on the SQL command "DROP TABLE" that it itself issued.

That concludes table deletion processing.

Figure 10:
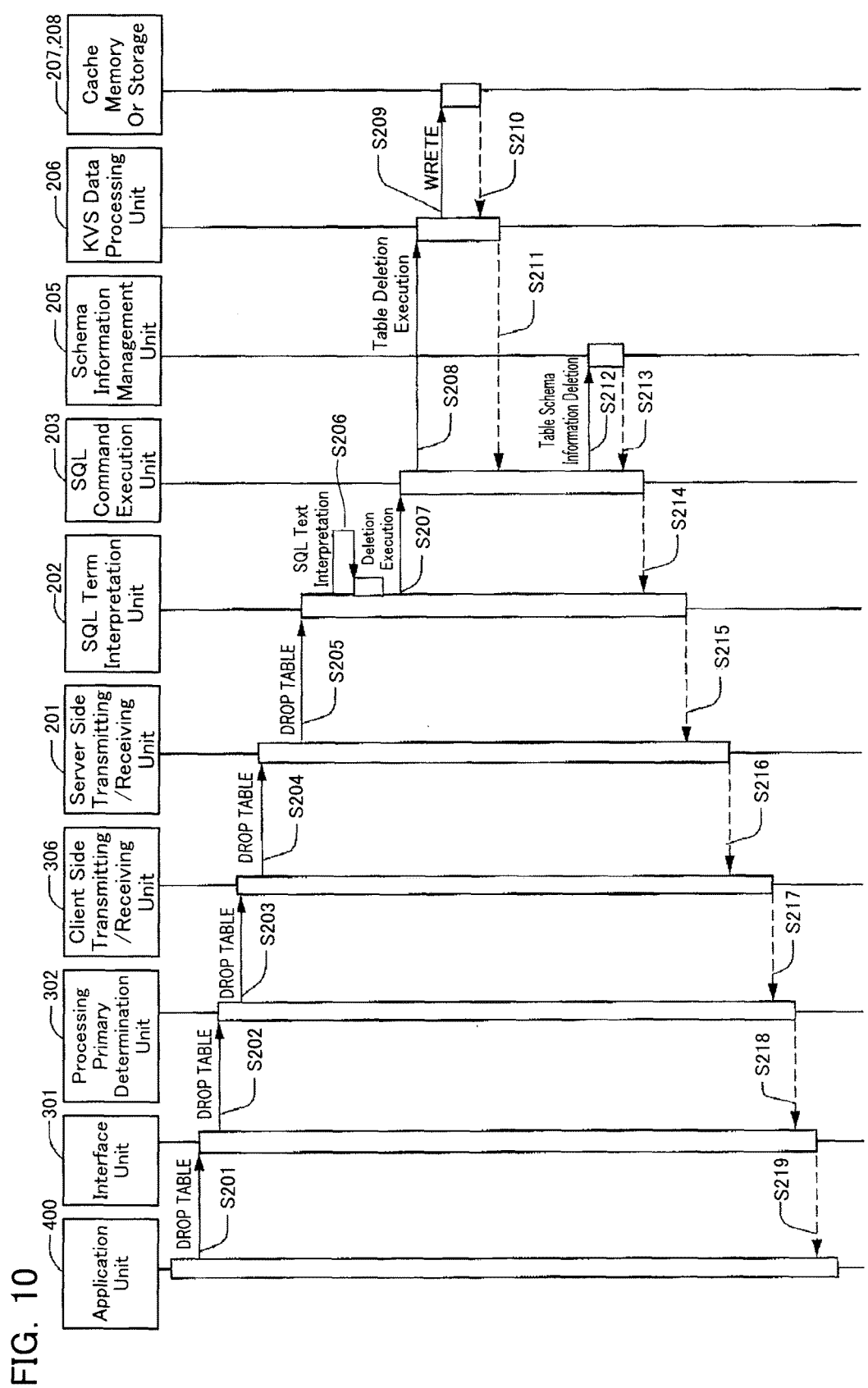
FIG. 10 is a sequence diagram of the table deletion processing corresponding to the flowcharts shown in FIGS. 8 and 9.

FIG. 10 shows a sequence diagram of the table deletion processing corresponding to the above-described flowcharts shown in FIGS. 8 and 9.

When the application unit 400 transmits the SQL command "DROP TABLE" to the interface unit 301 of the database client 300 (S201), the interface unit 301 transmits this SQL command "DROP TABLE" to the processing primary determination unit 302 (S202), and the processing primary determination unit 302 transmits this SQL command "DROP TABLE" to the client side transmitting/receiving unit 306 (S203). The client side transmitting/receiving unit 306 transmits this SQL command "DROP TABLE" to the server side transmitting/receiving unit 201 of the database server 200 (S204).

The server side transmitting/receiving unit 201 of the database server 200 that has received this SQL command "DROP TABLE" passes the SQL command "DROP TABLE" to the SQL term interpretation unit 202 (S205).

The SQL term interpretation unit S202 that has received the SQL command "DROP TABLE" executes term interpretation of the SQL command "DROP TABLE" (S206) and passes a table deletion execution instruction to the SQL command execution unit 203 based on a result of term interpretation (S207).

The SQL command execution unit 203 passes a request of table deletion to the KVS data processing unit 206 (S208).

The KVS data processing unit 206 that has received the previously mentioned request accesses the cache memory 207 or the storage 208 and instructs deletion of the table (S209). The cache memory 207 or the storage 208 deletes a specified table based on this instruction. The cache memory 207 or the storage 208 that has completed deletion of the table returns an execution result to the KVS data processing unit 206 (S210).

The KVS data processing unit 206 passes the execution result to the SQL command execution unit 203 (S211).

The SQL command execution unit 203 that has received the execution result of table deletion passes a deletion request of table schema information corresponding to the deleted table to the schema information management unit 205 (S212).

The schema information management unit 205 that has received the table schema information deletion request deletes the table schema information and returns an execution result of table schema information deletion to the SQL command execution unit 203 (S213).

The execution result of table schema information deletion and the execution result of table deletion are transmitted to the application unit 400 via, sequentially, the SQL term interpretation unit 202, the server side transmitting/receiving unit 201, the client side transmitting/receiving unit 306, the processing primary determination unit 302, and the interface unit 301 (S214 to S219). As a result, the application unit 400 is informed of the execution result of the SQL command that it itself issued.

That concludes table deletion processing.

[2.4. KVS-API Data Registration Processing]

Figure 11:
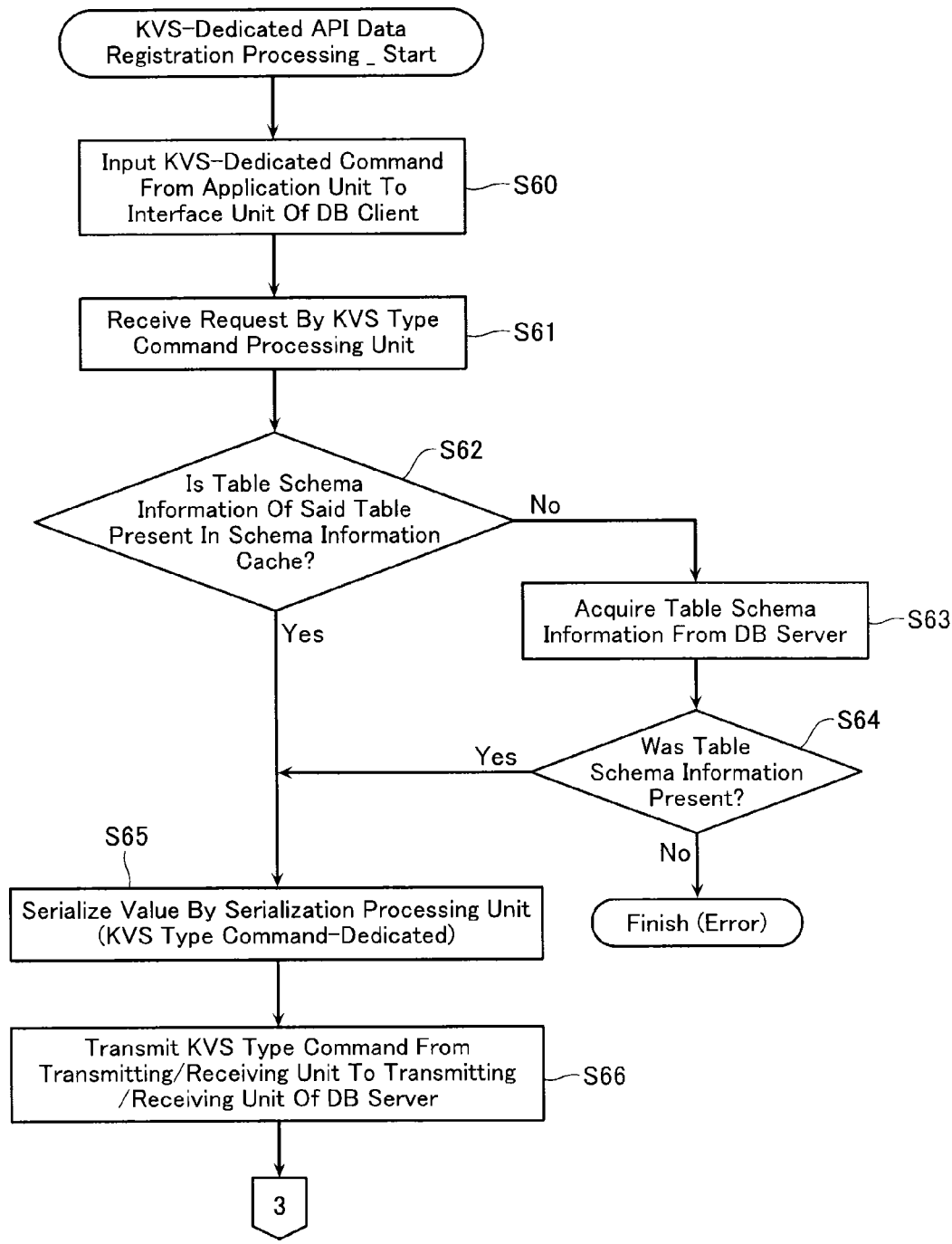
FIG. 11 is a flowchart showing one example of KVS-API data registration processing.
Figure 12:
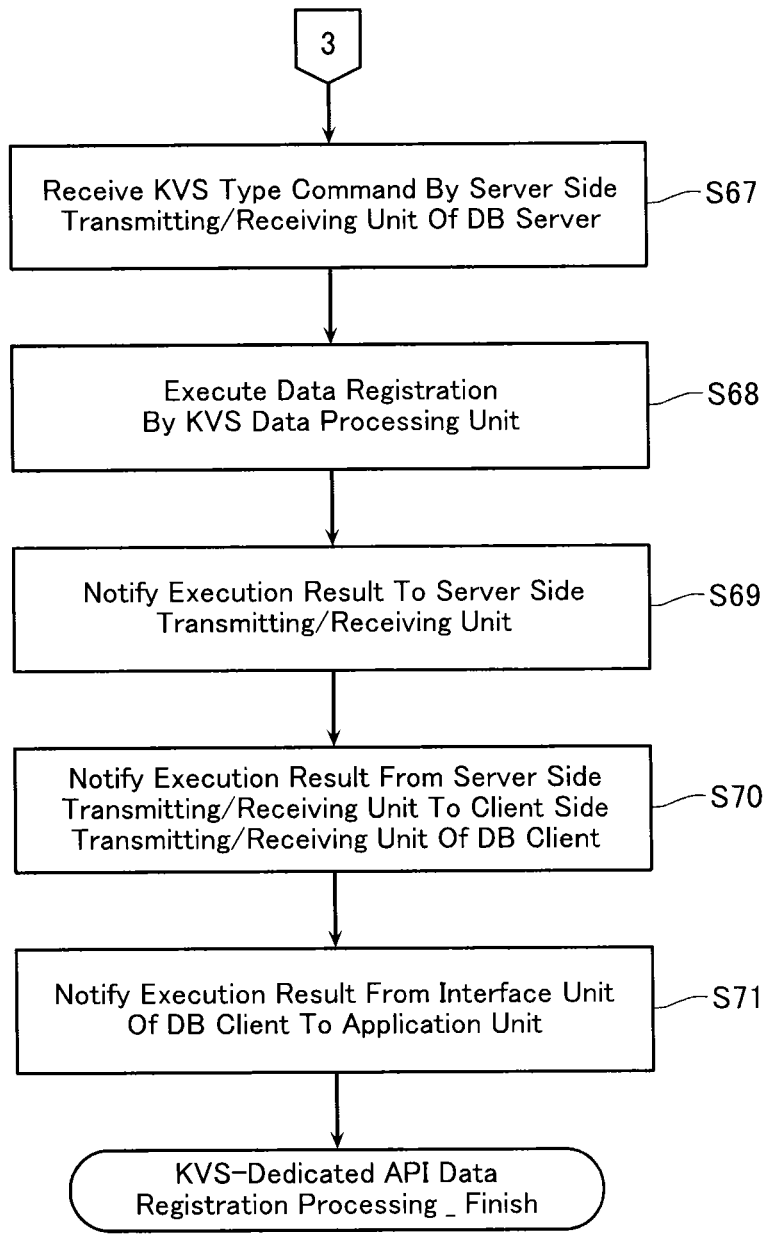
FIG. 12 is a flowchart continuing from the flowchart of FIG. 11.

KVS-API data registration processing executed by the database device 10 will be described. KVS-API data registration processing is processing that employs a KVS-API to perform data registration in the database server 200. FIG. 11 is a flowchart showing one example of KVS-API data registration processing, and FIG. 12 is a flowchart continuing from FIG. 11. KVS-API data registration processing will be described below with reference to these flowcharts.

In the KVS-API data registration processing, first, the database device 10, more specifically the application unit 400 transmits a KVS-dedicated command to the interface unit 301 of the database client 300 (S60).

The database device 10, more specifically the KVS type command processing unit 303, upon receiving the KVS-dedicated command (S61), determines whether there is table schema information of the table corresponding to said KVS-dedicated command in the schema information cache 305, or not (S62).

When it has been determined that there is no table schema information of the table corresponding to said KVS-dedicated command in the schema information cache 305 (S62, No), the KVS type command processing unit 303 requests to the database server 200 table schema information corresponding to said KVS-dedicated command (S63). Subsequently, the KVS type command processing unit 303 determines whether table schema information corresponding to said KVS-dedicated command could be acquired in the database server 200, or not (S64).

When it has been determined that table schema information corresponding to said KVS-dedicated command could not be acquired from the database server 200 (S64, No), KVS-API data registration processing results in an error and finishes. On the other hand, when it has been determined that table schema information corresponding to said KVS-dedicated command could be acquired from the database server 200 (S64, Yes), processing proceeds to a later-described step S65.

Description of KVS-API data registration processing will be continued, returning to previously mentioned step S62. In step S62, when it has been determined that there is table schema information of the table corresponding to said KVS-dedicated command in the schema information cache 305 (S62, Yes), the KVS type command processing unit 303 serializes the Value included in the KVS-dedicated command in the client side serialization processing unit 304 (S65). The client side serialization processing unit 304 returns the serialized data to the KVS type command processing unit 303. The KVS type command processing unit 303, upon receiving the serialized data, generates a KVS-dedicated command including this serialized data and passes this KVS-dedicated command to the client side transmitting/receiving unit 306.

The client side transmitting/receiving unit 306 transmits this KVS type command to the server side transmitting/receiving unit 201 of the database server 200 (S66).

The server side transmitting/receiving unit 201 of the database server 200, upon receiving the KVS type command (S67), passes this KVS type command to the KVS data processing unit 206.

The KVS data processing unit 206 instructs the cache memory 207 or the storage 208 to execute data registration, based on this KVS type command (S68).

The cache memory 207 or the storage 208 executes data registration based on the above-described instruction, and after execution, passes an execution result of data registration to the server side transmitting/receiving unit 201 via the KVS data processing unit 206 (S69).

The server side transmitting/receiving unit 201 transmits the execution result to the client side transmitting/receiving unit 306 of the database client 300 (S70).

The client side transmitting/receiving unit 306 passes the execution result to the interface unit 301 of the database client 300, and the interface unit 301 transmits the execution result to the application unit 400 (S71). As a result, the application unit 400 is informed of the execution result of KVS-API data registration processing.

That concludes KVS-API data registration processing.

Figure 13:
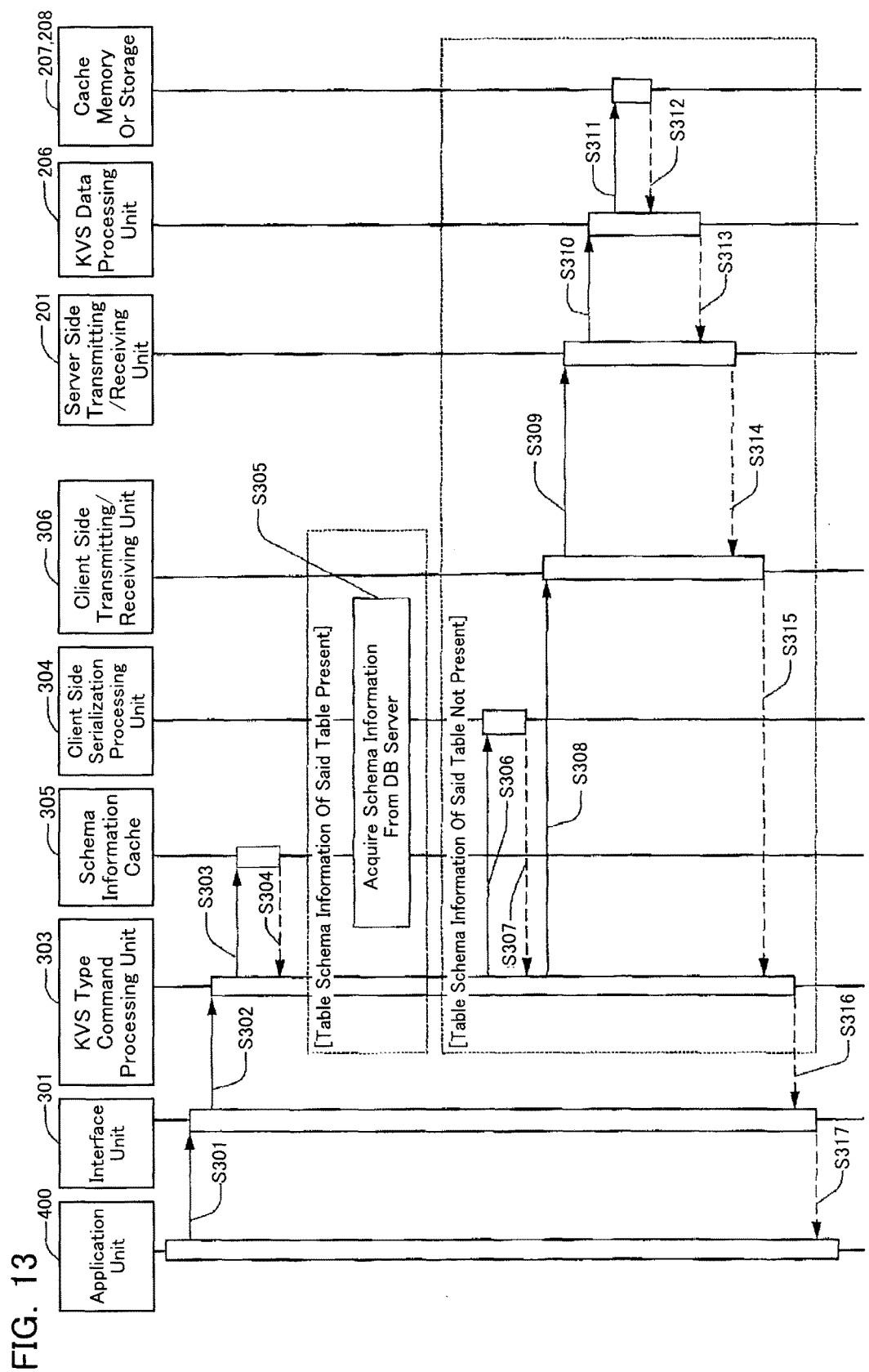
FIG. 13 is a sequence diagram of the KVS-API data registration processing corresponding to the flowcharts shown in FIGS. 11 and 12.

FIG. 13 shows a sequence diagram of the KVS-API data registration processing corresponding to the above-described flowcharts shown in FIGS. 11 and 12.

First, the database device 10, more specifically the application unit 400 passes the KVS-dedicated command to the interface unit 301 of the database client 300 (S301).

The database device 10, more specifically the KVS type command processing unit 303, upon receiving this KVS-dedicated command from the interface unit, requests the schema information cache 305 to read table schema information of the table corresponding to said KVS-dedicated command (S303).

The schema information cache 305, in the case of there being the requested table schema information, passes that table schema information to the KVS type command processing unit 303 (S304).

In the case of there not being the requested table schema information in the schema information cache 305, the database client 300 attempts acquisition of that table schema information from the database server 200 (S305). Processing content of this step S305 will be described later separately.

Now, in step S304, in the case that the schema information cache 305 has the requested table schema information and has passed that table schema information to the KVS type command processing unit 303, the KVS type command processing unit 303 requests the client side serialization processing unit 304 to serialize the Value included in the KVS-dedicated command (S306).

Based on the request of step S306, the client side serialization processing unit 304 generates serialized data and returns this to the KVS type command processing unit 303 (S307).

The KVS type command processing unit 303, upon receiving the serialized data, generates the KVS-dedicated command including this serialized data and passes this KVS-dedicated command to the client side transmitting/receiving unit 306 (S308).

The client side transmitting/receiving unit 306 transmits this KVS type command to the server side transmitting/receiving unit 201 of the database server 200 (S309).

The server side transmitting/receiving unit 201 of the database server 200, upon receiving the KVS type command from the client side transmitting/receiving unit 306, passes this KVS type command to the KVS data processing unit 206 (S310).

The KVS data processing unit 206 instructs the cache memory 207 or the storage 208 to execute data registration, based on this KVS type command (S311).

The cache memory 207 or the storage 208 executes data registration (write) based on the instruction of step S311, and passes the execution result of data registration to the server side transmitting/receiving unit 201 via the KVS data processing unit 206 (S312 and S313).

The server side transmitting/receiving unit 201 transmits the execution result to the client side transmitting/receiving unit 306 of the database client 300 (S314).

The client side transmitting/receiving unit 306 that has received the execution result from the server side transmitting/receiving unit 201 passes the execution result to the interface unit 301 via the KVS command processing unit of the database client 300 (S315 and S316), and the interface unit 301 that has received this execution result, transmits the execution result to the application unit 400 (S317). As a result, the application unit 400 is informed of the execution result of KVS-API data registration processing.

That concludes description of the sequence diagram of the KVS-API data registration processing shown in FIG. 13.

[2.5. Table Schema Information Acquisition Processing]

In the sequence diagram of the KVS-API data registration processing, that is, above-mentioned FIG. 13, in the case of there not being the requested table schema information in the schema information cache 305, the database client 300 performs table schema information acquisition processing which is processing that attempts acquisition of that table schema information from the database server 200 (S305). The table schema information acquisition processing of this step S305 will be related.

Figure 14:
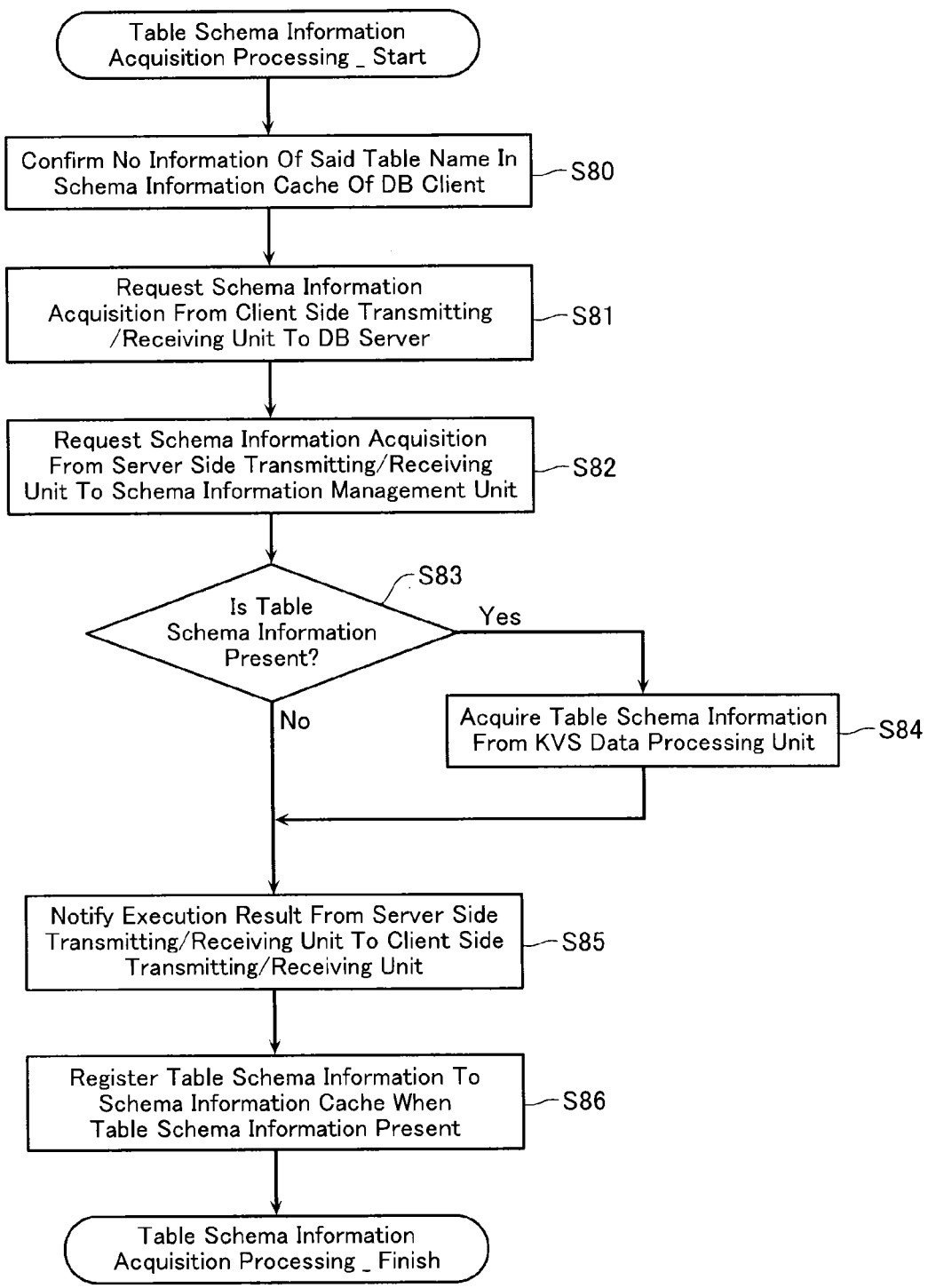
FIG. 14 is a flowchart showing one example of table schema information acquisition processing.

FIG. 14 is a flowchart showing one example of table schema information acquisition processing. One example of table schema information acquisition processing will be described with reference to the flowchart of FIG. 14. Note that this example is described on the assumption that said table schema information is not stored in the schema information cache 305.

In the table schema information acquisition processing, the database device 10, more specifically the KVS type command processing unit 303 confirms there is not table schema information corresponding to said table in the schema information cache 305 of the database client 300 (S80).

Next, the database device 10, more specifically the client side transmitting/receiving unit 306 of the database client 300 transmits to the database server 200 a message requesting table schema information (S81).

Next, the database device 10, more specifically the server side transmitting/receiving unit 201 of the database server 200, upon receiving the above-described message, requests to the schema information management unit 205 a read of table schema information specified in the above-described message (S82).

The schema information management unit 205 determines whether the above-described table schema information is stored or not (S83). In the case it has been determined that the above-described table schema information is stored (S83, Yes), the KVS data processing unit 206 reads said table schema information from the cache memory 207 or the storage 208, and the KVS data processing unit 206 acquires the table schema information (S84). After this, processing proceeds to step S85 which will be mentioned later.

On the other hand, in the case it has been determined in step S83 that the above-described table schema information is not stored (S83, No), the schema information management unit 205 transmits an execution result of table schema information acquisition to the client side transmitting/receiving unit 306 via the server side transmitting/receiving unit 201. Note that in step S84, when acquisition of table schema information has succeeded, the table schema information is transmitted along with the above-described execution result to the client side transmitting/receiving unit 306, and the client side transmitting/receiving unit 306 receives the execution result (along with table schema information in the case that it existed) (S85). The client side transmitting/receiving unit 306 passes the execution result to the KVS type command processing unit 303.

Note that in the case where the client side transmitting/receiving unit 306 has received table schema information, the KVS type command processing unit 303 passes that table schema information to the schema information cache 305, and the schema information cache 305 stores that table schema information (S86).

That concludes table schema information acquisition processing.

Figure 15:
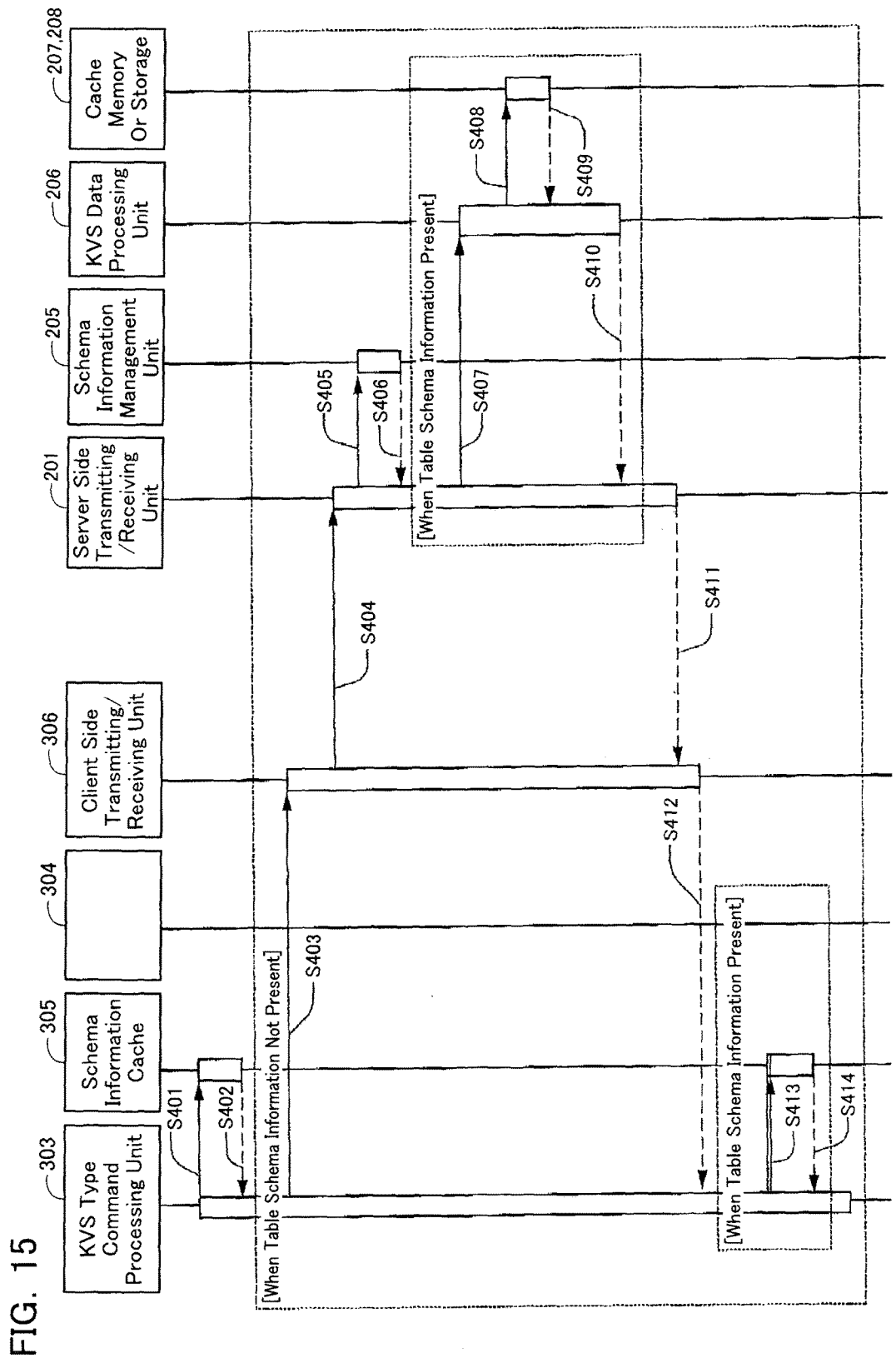
FIG. 15 is a sequence diagram of the table schema information acquisition processing corresponding to the flowchart of FIG. 14.

FIG. 15 shows a sequence diagram of the table schema information acquisition processing corresponding to the above-described flowchart of FIG. 14.

In the table schema information acquisition processing, first, the KVS type command processing unit 303 of the database client 300 requests said table schema information to the schema information cache 305 (S401).

The schema information cache 305 passes a read result of the requested table schema information to the KVS type command processing unit 303 (S402). Note that the description hereafter assumes that the schema information cache 305 is not storing the requested table schema information.

The KVS type command processing unit 303 that has received from the schema information cache 305 notification that the requested table schema information is not stored, passes the table schema information acquisition request to the client side transmitting/receiving unit 306 (S403). The client side transmitting/receiving unit 306 transmits the table schema information acquisition request to the server side transmitting/receiving unit 201 (S404).

The server side transmitting/receiving unit 201, upon receiving the table schema information acquisition request, passes a query of presence/absence of table schema information to the schema information management unit 205 (S405). The schema information management unit 205 returns presence/absence of the requested table schema information to the server side transmitting/receiving unit 201 (S406). Note that the description hereafter describes the case where the schema information management unit 205 has returned to the server side transmitting/receiving unit 201 information that the requested table schema information is present. In the case where the schema information management unit 205 has returned to the server side transmitting/receiving unit 201 information that the requested table schema information is not present, processing proceeds directly to step S411 which will be mentioned later.

The server side transmitting/receiving unit 201 that has received from the schema information management unit 205 information that the requested table schema information is present, passes said table schema information acquisition request to the KVS data processing unit 206 (S407).

The KVS data processing unit 206 that has received the table schema information acquisition request, requests read of said table schema information to the cache memory 207 or the storage 208 (S408).

The cache memory 207 or the storage 208 that has received the request of read of table schema information reads said table schema information and returns this to the KVS data processing unit 206 (S409).

The KVS data processing unit 206 that has received the table schema information from the cache memory 207 or the storage 208 passes this table schema information to the server side transmitting/receiving unit 201 (S410).

The server side transmitting/receiving unit 201 transmits this table schema information to the client side transmitting/receiving unit 306 (S411). Note that in the case where the schema information management unit 205 has returned to the server side transmitting/receiving unit 201 information that the requested table schema information is not present, the server side transmitting/receiving unit 201 transmits to the client side transmitting/receiving unit 306 a message to the effect that there is not said table schema information.

The client side transmitting/receiving unit 306 that has received the request-related table schema information or the message to the effect that there is not said table schema information, passes these to the KVS type command processing unit 303 (S412).

In the case of receiving table schema information, the KVS type command processing unit 303 passes said table schema information to the schema information cache 305 (S413). In the case of receiving the message to the effect that there is not said table schema information, table schema information acquisition processing finishes as it stands.

The schema information cache 305 that has received the table schema information stores said table schema information and returns a stored result to the KVS type command processing unit 303 (S414).

That concludes description of the sequence diagram of the table schema information acquisition processing shown in FIG. 15.

[2.6. SQL Data Registration Processing]

SQL data registration processing will be related. SQL data registration processing is processing where in the case that the application unit 400 has passed to the database client 300 an SQL command requesting data registration, the database device 10 performs data registration based on this SQL command.

Figure 16:
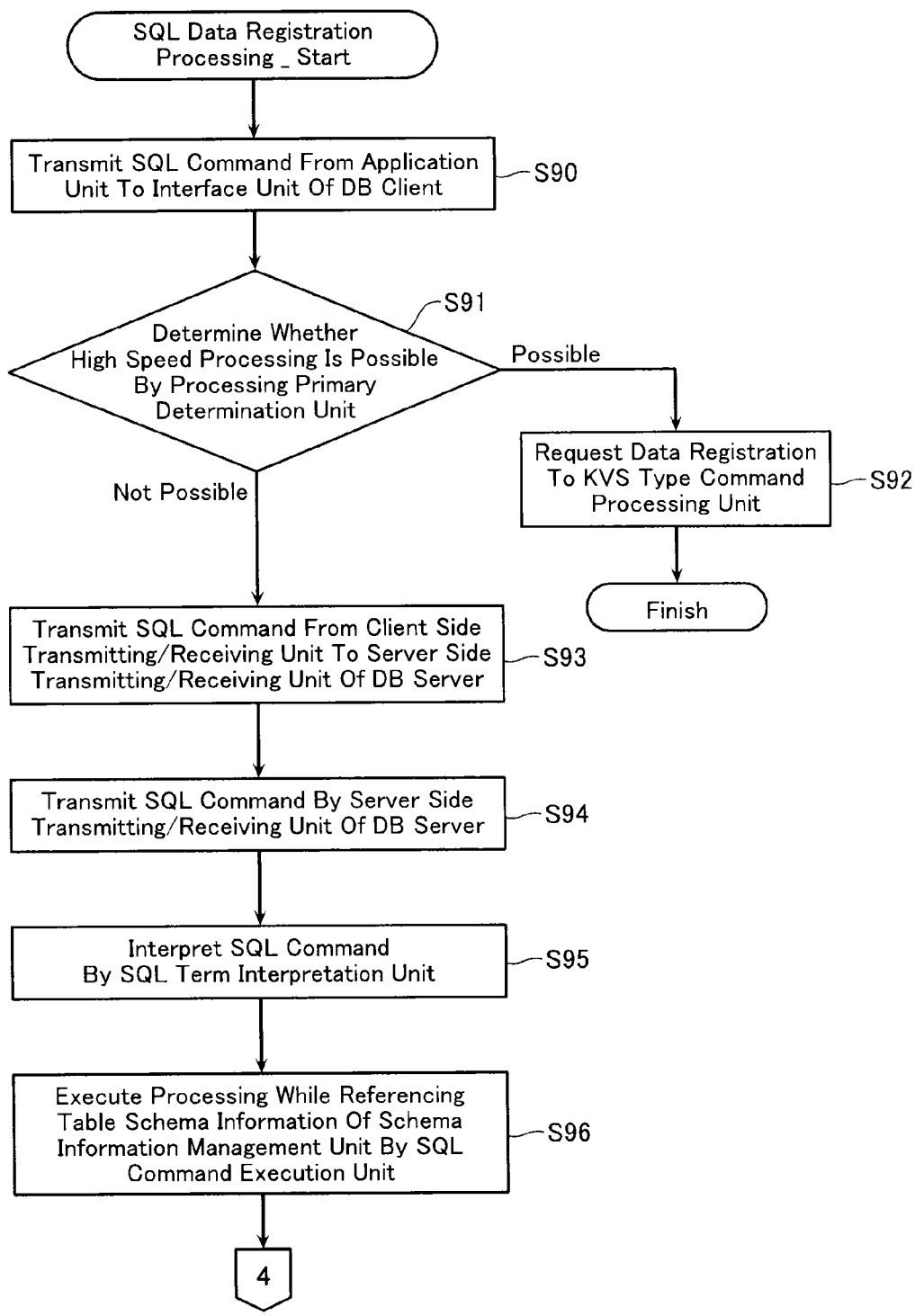
FIG. 16 is a flowchart showing one example of SQL data registration processing.
Figure 17:
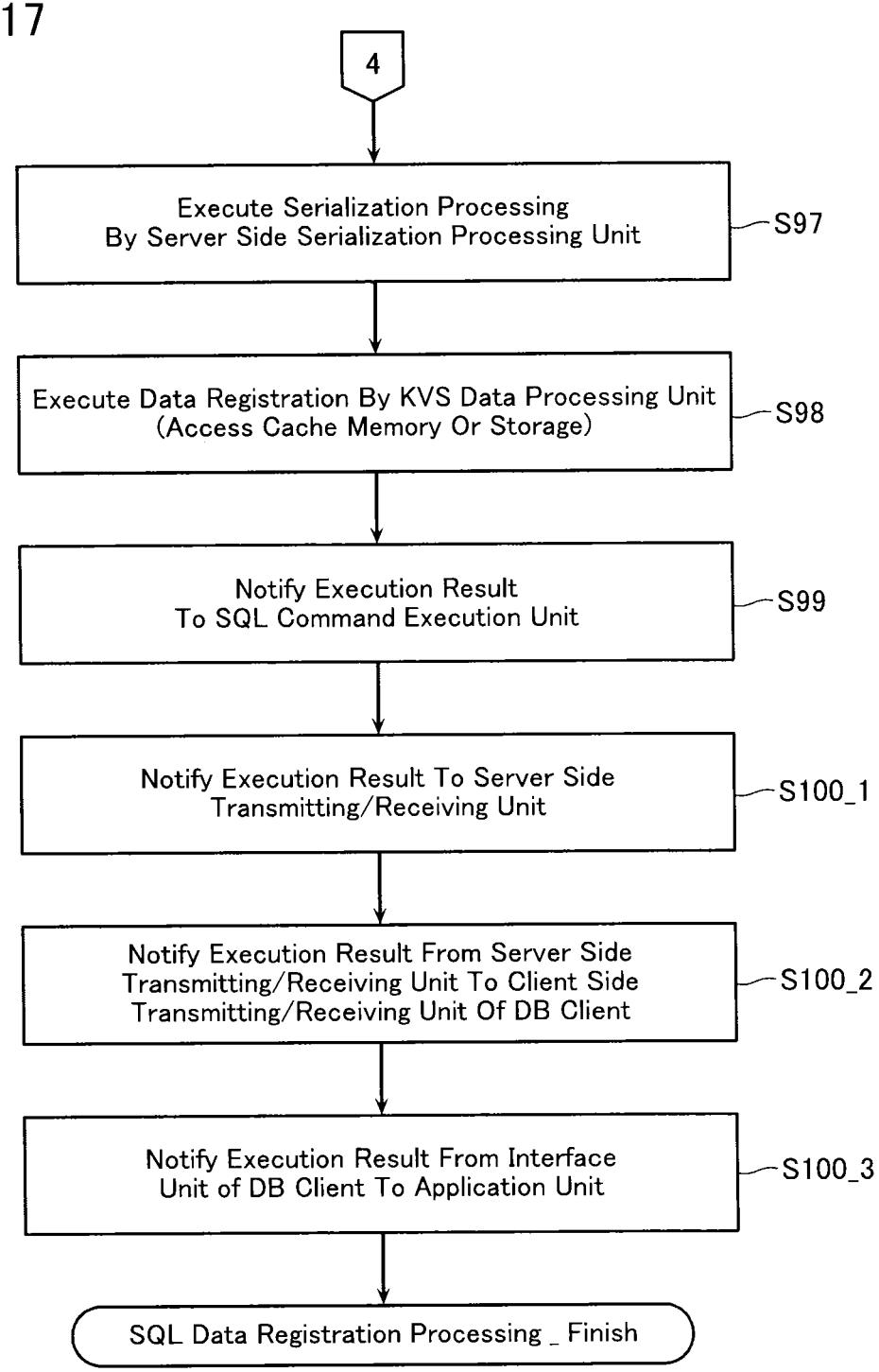
FIG. 17 is a flowchart continuing from the flowchart of FIG. 16.

FIG. 16 is a flowchart showing one example of SQL data registration processing, and FIG. 17 is a flowchart of data registration processing continuing from FIG. 16. One example of SQL data registration processing will be described below with reference to the flowcharts of FIGS. 16 and 17.

In SQL data registration processing, first, the application unit 400 transmits to the interface unit 301 of the database client 300 an SQL command requesting data registration (S90). The interface unit 301 passes this SQL command to the processing primary determination unit 302.

The processing primary determination unit 302 that has received this SQL command determines whether high speed processing of said SQL command is possible or not (S91).

In the case it has been determined in step S91 that high speed processing of said SQL command is possible (S91, Possible), the processing primary determination unit 302 generates a KVS type command corresponding to said SQL command and passes this KVS type command to the KVS type command processing unit 303 (S92). Subsequently, processing similar to that of the previously described KVS-API data registration processing is executed and SQL data registration processing finishes.

On the other hand, in the case it has been determined in step S91 that high speed processing of said SQL command is not possible (S91, Not Possible), the processing primary determination unit 302 passes said SQL command to the client side transmitting/receiving unit 306, and the client side transmitting/receiving unit 306 transmits this SQL command to the server side transmitting/receiving unit 201 (S93).

The server side transmitting/receiving unit 201 of the database server 200, upon receiving the SQL command (S94), passes this SQL command to the SQL term interpretation unit 202.

The SQL term interpretation unit 202 interprets this SQL command and passes an interpretation result to the SQL command execution unit 203 (S95).

The SQL command execution unit 203 requests to the schema information management unit 205 table schema information of the table specified by the SQL command from the schema information management unit 205, and acquires this table schema information. The SQL command execution unit 203 passes the table schema information and data included in the SQL command, to the server side serialization processing unit 204 (S96). The server side serialization processing unit 204 generates serialized data from the table schema information and data included in the SQL command, and returns this to the SQL command execution unit 203 (S97).

The SQL command execution unit 203 passes the serialized data to the KVS data processing unit 206. The KVS data processing unit 206 accesses the cache memory 207 or the storage 208 and writes the serialized data to the cache memory 207 or the storage 208 (S98).

The cache memory 207 or the storage 208 passes to the SQL command execution unit 203 an execution result which is a result written to the cache memory 207 or the storage 208 (S99).

The SQL command execution unit 203 passes this execution result to the server side transmitting/receiving unit 201 (S100_1). The server side transmitting/receiving unit 201 transmits this execution result to the client side transmitting/receiving unit 306 (S100_2).

The client side transmitting/receiving unit 306 passes this execution result to the application unit 400 via the processing primary determination unit 302 and the interface unit 301 (S100_3). The application unit 400 acquires the execution result of the requested data registration.

That concludes SQL data registration processing.

Figure 18:
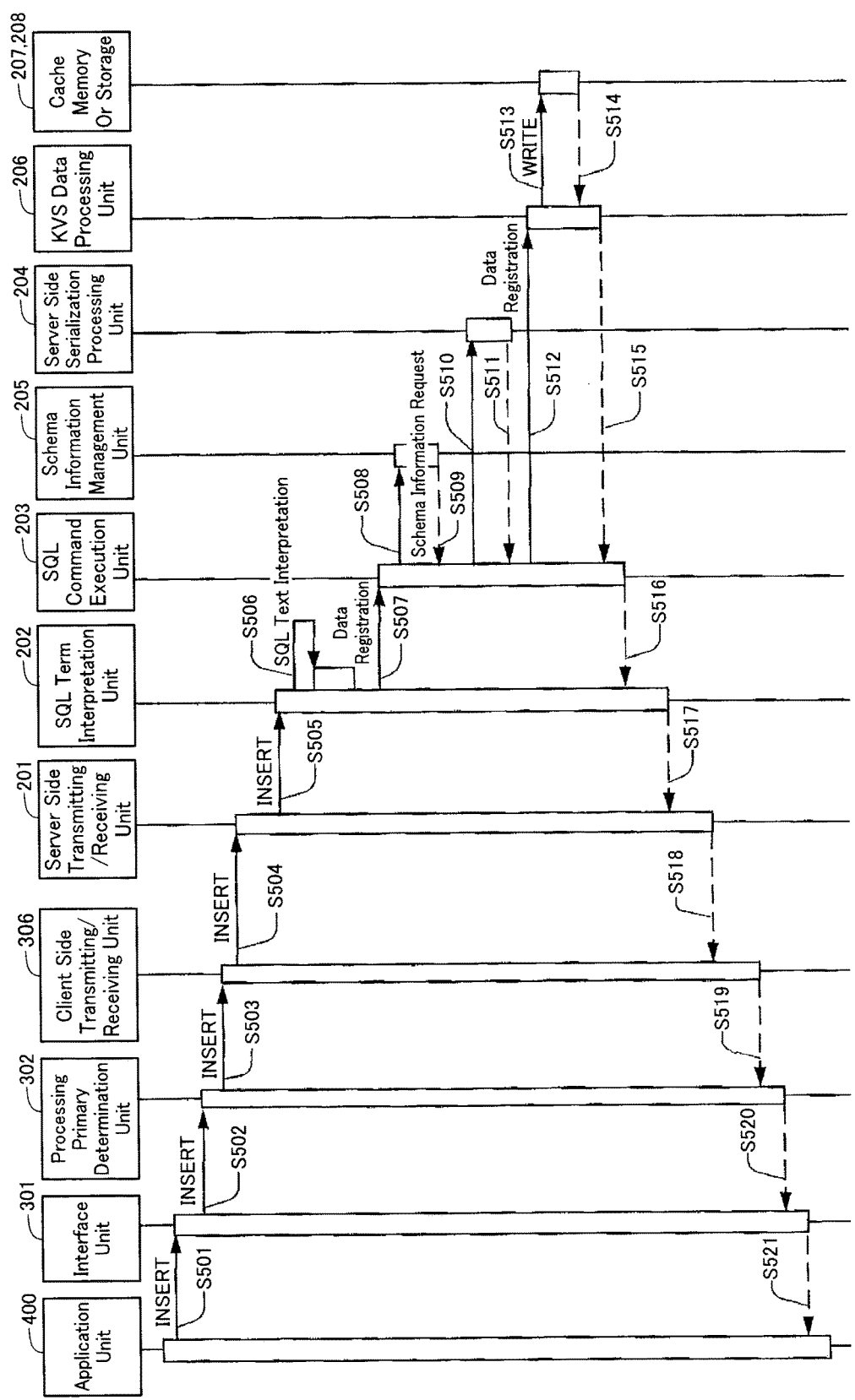
FIG. 18 is a sequence diagram of the SQL data registration processing corresponding to the flowcharts shown in FIGS. 16 and 17.

FIG. 18 shows a sequence diagram of the SQL data registration processing corresponding to the above-described flowcharts shown in FIGS. 16 and 17. Note that the present sequence diagram describes a flow in the case where it was determined by the processing primary determination unit 302 that high speed processing is not possible.

In SQL data registration processing, the application unit 400 passes to the interface unit 301 an SQL command "INSERT" requesting data registration (S501). The interface unit 301 that has received this SQL command "INSERT" passes the SQL command "INSERT" to the processing primary determination unit 302 (S502). The processing primary determination unit 302 that has received this SQL command "INSERT" determines that high speed processing is not possible and passes this SQL command "INSERT" to the client side transmitting/receiving unit 306 (S503).

The client side transmitting/receiving unit 306 transmits this SQL command "INSERT" to the server side transmitting/receiving unit 201 of the database server 200 (S504). The server side transmitting/receiving unit 201 that has received the SQL command passes this SQL command to the SQL term interpretation unit 202 (S505). The SQL term interpretation unit 202 that has received this SQL command executes term interpretation of an SQL text (S506).

The SQL term interpretation unit 202 that has executed term interpretation of the SQL text passes an interpretation result to the SQL command execution unit 203 (S507).

The SQL command execution unit 203 requests to the schema information management unit 205 table schema information of the table specified by the SQL command (S508). In the case that said table schema information is stored within the database server 200, the schema information management unit 205 returns said table schema information to the SQL command execution unit 203 (S509).

The SQL command execution unit 203 that has acquired the table schema information passes data (Key and Value) included in the SQL command, and the table schema information, to the server side serialization processing unit 204 (S510).

The server side serialization processing unit 204 that has received the data (Key and Value) and the table schema information serializes these and returns the serialized data to the SQL command execution unit 203 (S511).

The SQL command execution unit 203 that has received the serialized data passes the serialized data to the KVS data processing unit 206 (S512).

The KVS data processing unit 206 that has received the serialized data accesses the cache memory 207 or the storage 208 and causes the serialized data to be written to the cache memory 207 or the storage 208 (S513).

The cache memory 207 or the storage 208 passes an execution result showing a result of being written to, to the KVS data processing unit 206 (S514). The KVS data processing unit 206 that has received the execution result passes this execution result to the SQL command execution unit 203 (S515). The SQL command execution unit 203 passes this execution result to the SQL term interpretation unit 202 (S516). The SQL term interpretation unit 202 that has received the execution result passes this execution result to the server side transmitting/receiving unit 201 (S517). The server side transmitting/receiving unit 201 transmits this execution result to the client side transmitting/receiving unit 306 of the database client 300 (S518).

The client side transmitting/receiving unit 306 that has received the execution result passes this execution result to the application unit 400 via, sequentially, the processing primary determination unit 302 and the interface unit 301 (S519, S520, and S521).

That concludes description of the sequence diagram of the SQL data registration processing shown in FIG. 18.

[2.7. KVS-API Data Acquisition Processing]

KVS-API data acquisition processing will be related. KVS-API data acquisition processing is processing where in the case that the application unit 400 has passed to the database client 300 a KVS command requesting data acquisition (read), the database device 10 performs data acquisition based on this KVS command.

Figure 19:
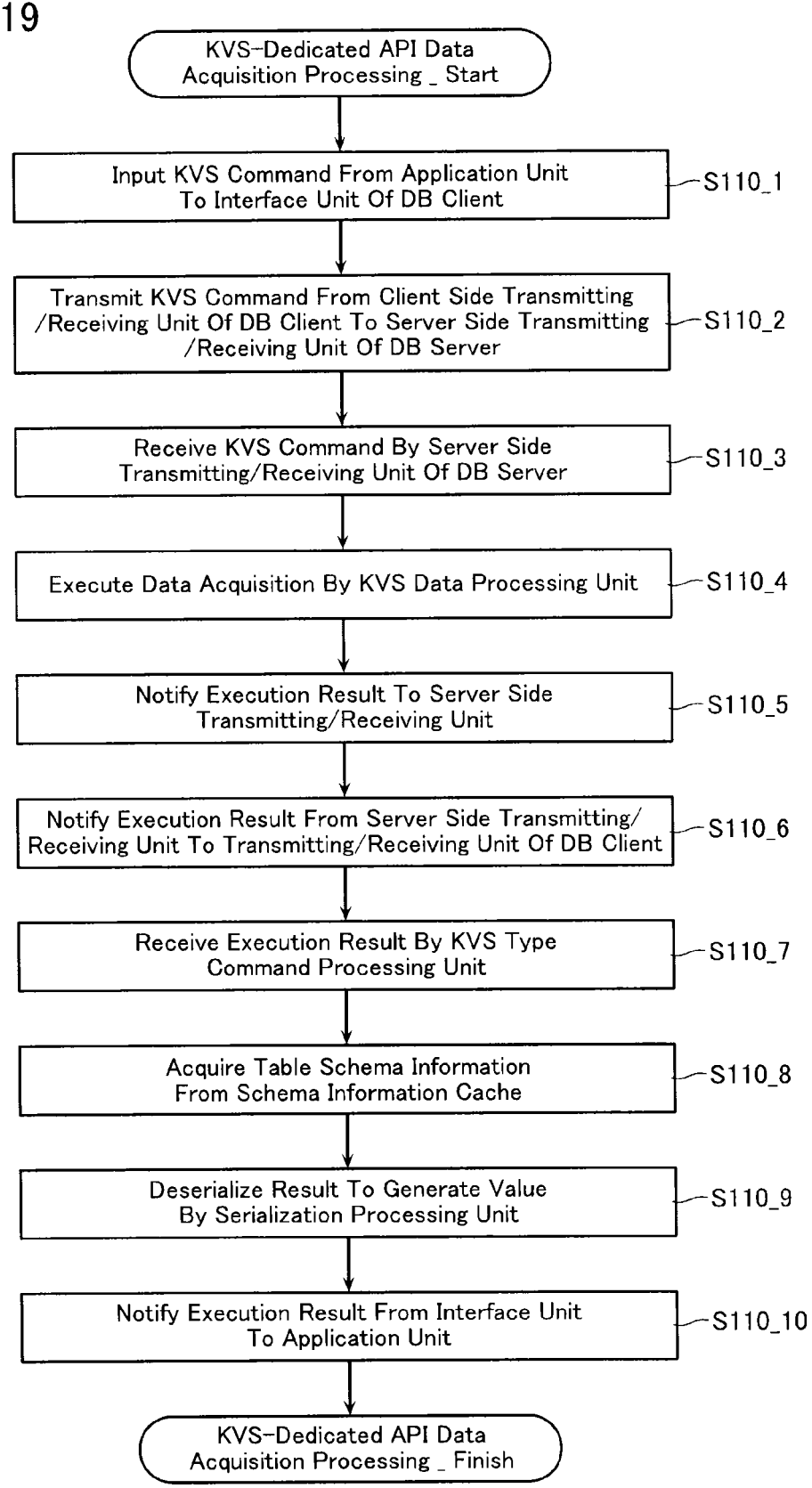
FIG. 19 is a flowchart showing one example of KVS-API data acquisition processing.

FIG. 19 is a flowchart showing one example of KVS-API data acquisition processing. One example of KVS-API data acquisition processing will be described with reference to the flowchart of FIG. 19.

In KVS-API data acquisition processing, first, the application unit 400 of the database client 300 passes to the interface unit 301 a KVS command requesting data acquisition (S110_1).

The interface unit 301 passes this KVS command to the client side transmitting/receiving unit 306 of the database client 300, and the client side transmitting/receiving unit 306 transmits the KVS command to the server side transmitting/receiving unit 201 of the database server 200 (S110_2).

The server side transmitting/receiving unit 201 of the database server 200, upon receiving this KVS command, passes this KVS command to the KVS command processing unit 303 (S110_3).

The KVS data processing unit 206 accesses the cache memory 207 or the storage 208 and acquires data requested by the KVS command from the cache memory 207 or the storage 208 (S110_4).

The KVS data processing unit 206 passes an execution result of data acquisition processing (including acquired data) to the server side transmitting/receiving unit 201 (S110_5). The server side transmitting/receiving unit 201 transmits this execution result to the client side transmitting/receiving unit 306 (S110_6).

The client side transmitting/receiving unit 306 passes the received execution result to the KVS type command processing unit 303 (S110_7).

The KVS type command processing unit 303 reads from the schema information cache 305 table schema information corresponding to data included in the execution result (S110_8).

The KVS type command processing unit 303 passes the data included in the execution result and the table schema information acquired in step S110_8 to the client side serialization processing unit 304. The client side serialization processing unit 304 that has received the data included in the execution result and the table schema information acquired in step S110_8 deserializes the data to generate a Value from the data and returns the generated Value to the KVS type command processing unit 303 (S110_9).

The KVS type command processing unit 303 passes the above-described Value and the execution result to the interface unit 301, and the interface unit 301 passes the above-described Value and the execution result to the application unit 400 (S110_10).

That concludes KVS-API data acquisition processing.

Figure 20:
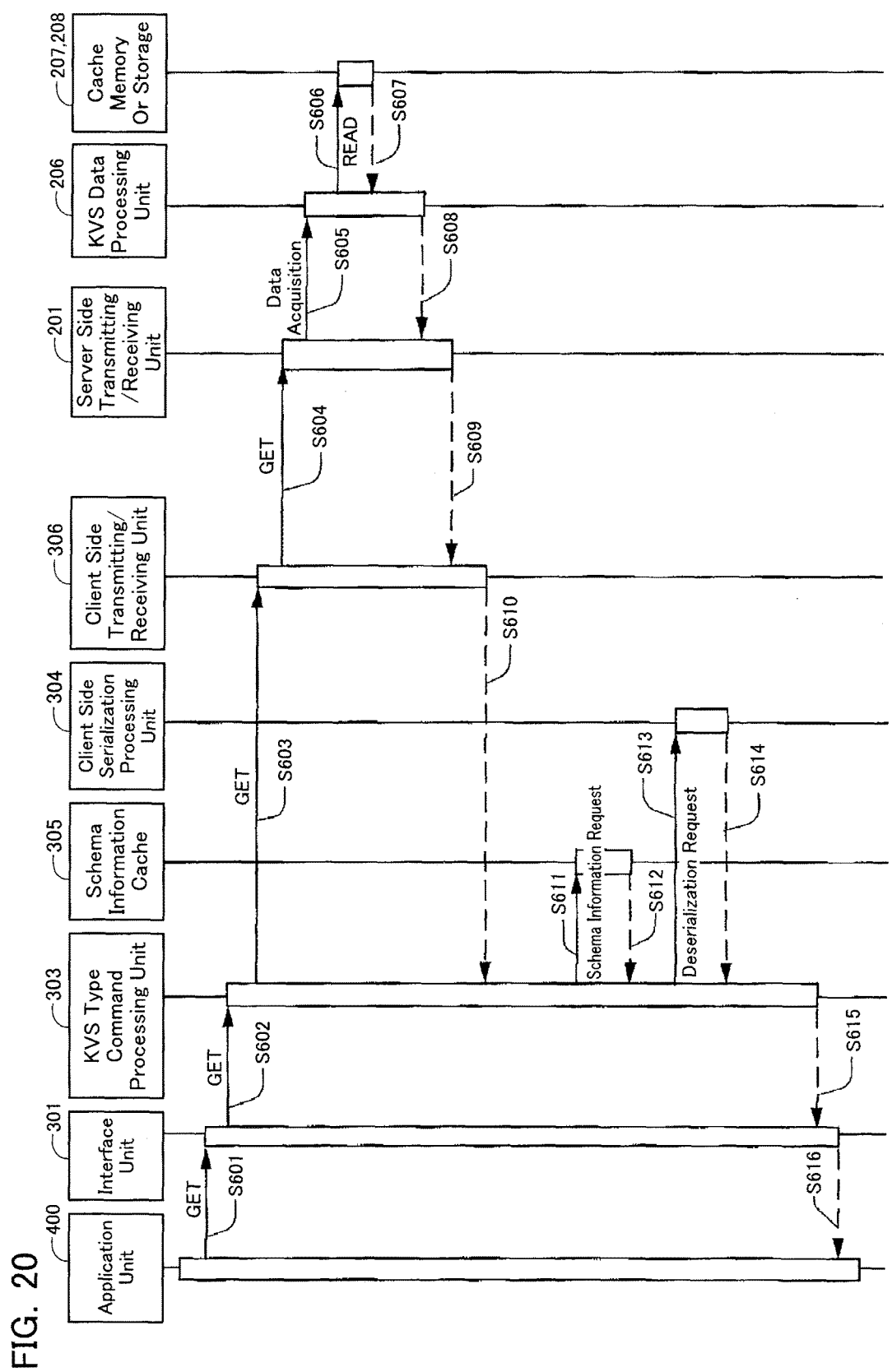
FIG. 20 is a sequence diagram of the KVS-API data acquisition processing corresponding to the flowchart shown in FIG. 19.

FIG. 20 shows a sequence diagram of the KVS-API data acquisition processing corresponding to the above-described flowchart shown in FIG. 19.

The application unit 400 of the database client 300 passes to the interface unit 301 the KVS command requesting data acquisition (S601).

The interface unit 301 passes this KVS command to the KVS type command processing unit 303 (S602).

The KVS type command processing unit 303 passes this KVS command to the client side transmitting/receiving unit 306 (S603). The client side transmitting/receiving unit 306 that has received the KVS command transmits this KVS command to the server side transmitting/receiving unit 201 of the database server 200 (S604).

The server side transmitting/receiving unit 201 of the database server 200, upon receiving this KVS command, passes this KVS command to the KVS type command processing unit 303 (S605).

The KVS data processing unit 206 accesses the cache memory 207 or the storage 208 and requests read of data requested by the KVS command from the cache memory 207 or the storage 208 (S606).

The cache memory 207 or the storage 208 returns the data to the KVS data processing unit 206, based on the read request of data (S607).

The KVS data processing unit 206 that has received the data passes the execution result of data acquisition processing (including the acquired data) to the server side transmitting/receiving unit 201 (S608). The server side transmitting/receiving unit 201 transmits this execution result to the client side transmitting/receiving unit 306 (S609).

The client side transmitting/receiving unit 306 passes the received execution result to the KVS type command processing unit 303 (S610).

The KVS type command processing unit 303 requests to the schema information cache 305 table schema information corresponding to data included in the execution result (S611), and the schema information cache 305 passes the requested table schema information to the KVS type command processing unit 303 (S612).

The KVS type command processing unit 303 passes the data included in the execution result and the table schema information acquired in steps S611 and S612 to the client side serialization processing unit 304 (S613). The client side serialization processing unit 304 that has received the data included in the execution result and the table schema information acquired in steps S611 and S612 deserializes the data to generate a Value from the data and returns the generated Value to the KVS type command processing unit 303 (S614).

The KVS type command processing unit 303 passes the above-described Value and the execution result to the interface unit 301 (S615). The interface unit 301 passes the above-described Value and the execution result to the application unit 400 (S616).

That concludes description of the sequence diagram of the KVS-API data acquisition processing shown in FIG. 20.

[2.8. SQL Data Acquisition Processing]

SQL data acquisition processing will be related. SQL data acquisition processing is processing where in the case that the application unit 400 has passed to the database client 300 an SQL command requesting data acquisition (read), the database device 10 performs data acquisition based on this SQL command.

Figure 21:
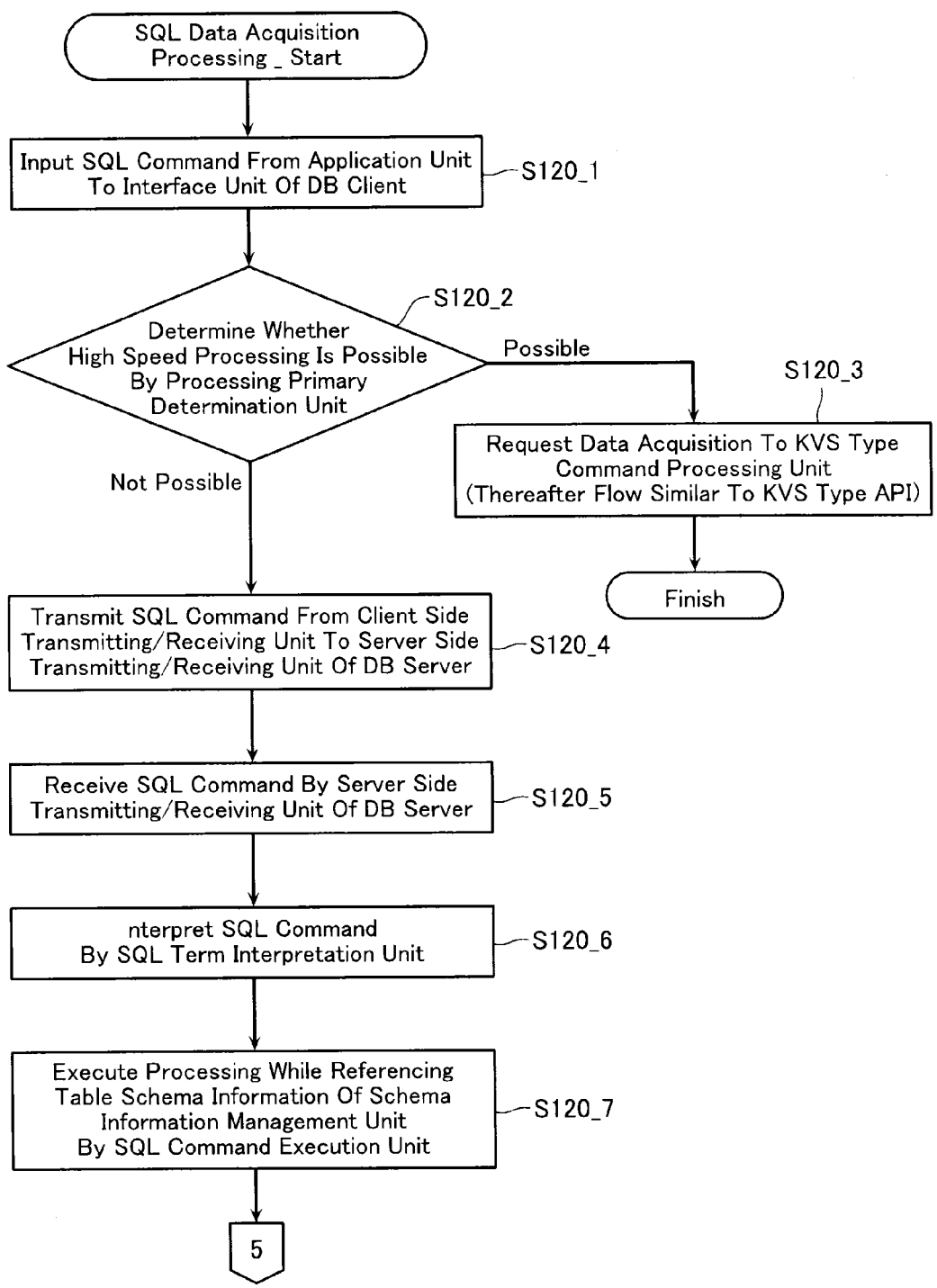
FIG. 21 is a flowchart showing one example of SQL data acquisition processing.
Figure 22:
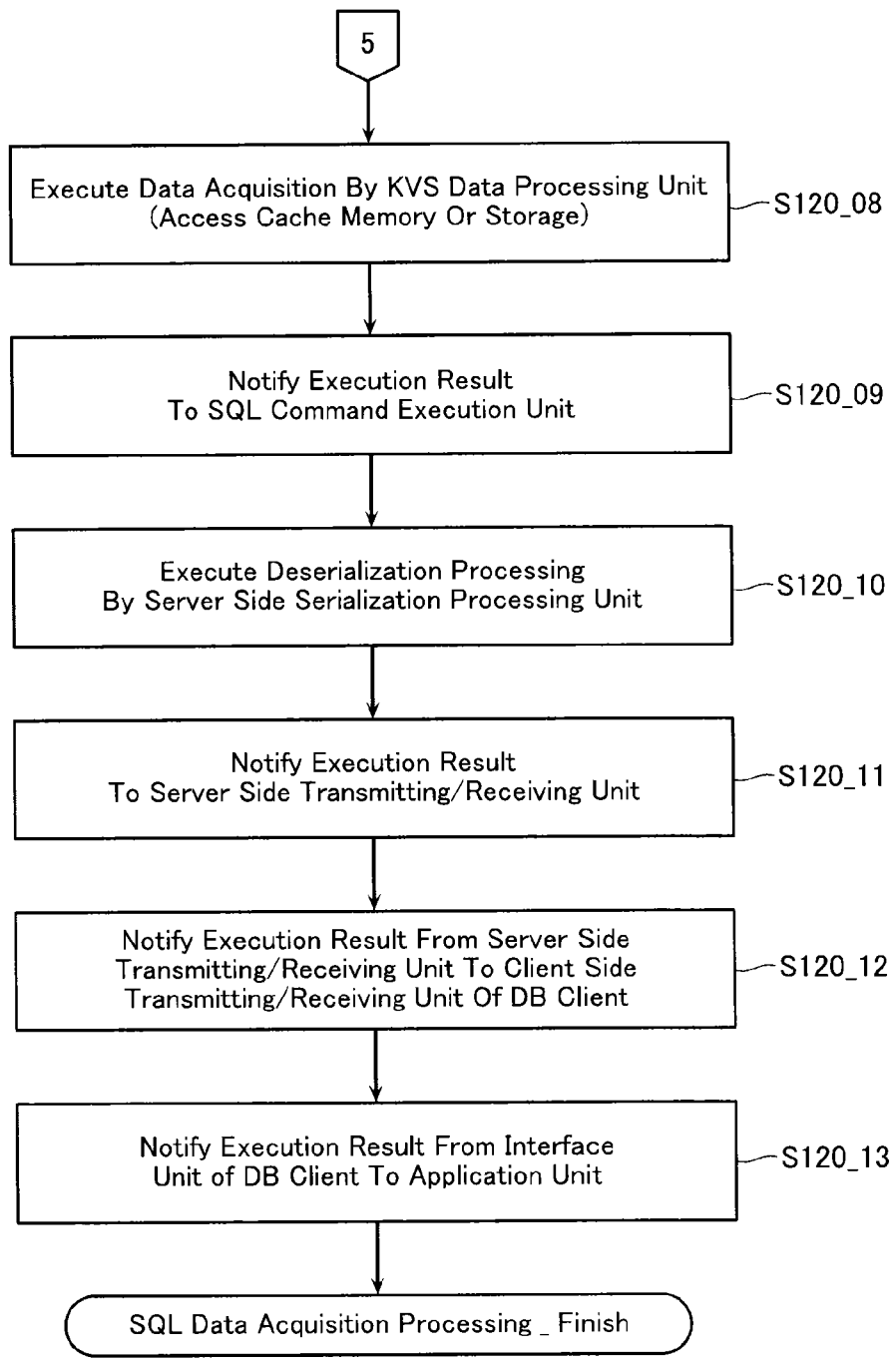
FIG. 22 is a flowchart continuing from the flowchart of FIG. 21.

FIG. 21 is a flowchart showing one example of SQL data acquisition processing, and FIG. 22 is a flowchart continuing from the flowchart of FIG. 21. One example of SQL data acquisition processing will be described with reference to the flowcharts of FIGS. 21 and 22.

In SQL data acquisition processing, first, the application unit 400 transmits to the interface unit 301 of the database client 300 an SQL command requesting data acquisition (S120_1). The interface unit 301 passes this SQL command to the processing primary determination unit 302.

The processing primary determination unit 302 that has received this SQL command determines whether high speed processing of said SQL command is possible or not (S120_2).

In the case it has been determined in step S1202 that high speed processing of said SQL command is possible (S120_2, Possible), the processing primary determination unit 302 generates a KVS type command corresponding to said SQL command and passes this KVS type command to the KVS type command processing unit 303 (S120_3). Subsequently, processing similar to that of the previously described KVS-API data acquisition processing is executed and SQL data acquisition processing finishes.

On the other hand, in the case it has been determined in step S120_2 that high speed processing of said SQL command is not possible (S120_2, Not Possible), the processing primary determination unit 302 passes said SQL command to the client side transmitting/receiving unit 306, and the client side transmitting/receiving unit 306 transmits this SQL command to the server side transmitting/receiving unit 201 (S120_4).

The server side transmitting/receiving unit 201 of the database server 200, upon receiving the SQL command, passes the SQL command to the SQL term interpretation unit 202 (S120_5).

The SQL term interpretation unit 202 interprets this SQL command and passes an interpretation result to the SQL command execution unit 203 (S120_6).

The SQL command execution unit 203 requests to the schema information management unit 205 table schema information of the table specified by the SQL command, and acquires this table schema information. The SQL command execution unit 203 passes the table schema information and data included in the SQL command, to the KVS data processing unit 206 (S120_7).

The KVS data processing unit 206 accesses the cache memory 207 or the storage 208 and reads serialized data from the cache memory 207 or the storage 208 (S120_8). The cache memory 207 or the storage 208 passes the serialized data to the KVS data processing unit 206. The KVS data processing unit 206 returns an execution result including the serialized data to the SQL command execution unit 203 (S120_9).

The SQL command execution unit 203 passes the received serialized data to the server side serialization processing unit 204. The server side serialization processing unit 204 deserializes the serialized data to generate deserialized data (S120_10).

The server side serialization processing unit 204 returns the deserialized data to the SQL command execution unit 203. The SQL command execution unit 203 that has received the deserialized data passes an execution result of data acquisition (including the deserialized data) to the server side transmitting/receiving unit 201 (S120_11).

The server side transmitting/receiving unit 201 that has received the execution result (including the deserialized data) transmits this execution result to the client side transmitting/receiving unit 306 (S120_12).

The client side transmitting/receiving unit 306 that has received the execution result passes this execution result to the application unit 400 via the processing primary determination unit 302 and the interface unit 301.

That concludes SQL data acquisition processing.

Figure 23:
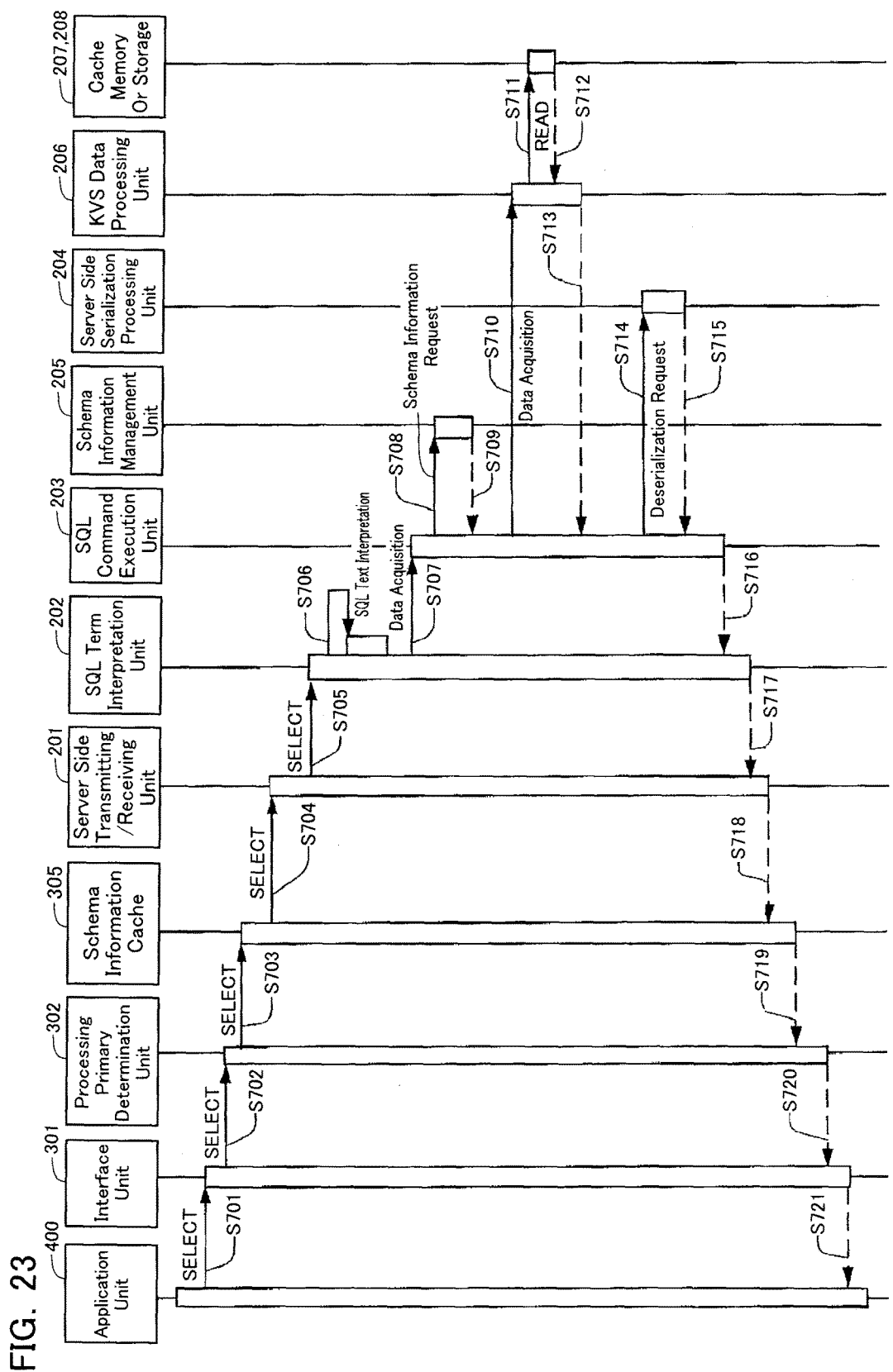
FIG. 23 is a sequence diagram of the SQL data acquisition processing corresponding to the flowcharts shown in FIGS. 21 and 22.

FIG. 23 shows a sequence diagram of the SQL data acquisition processing corresponding to the above-described flowcharts of FIGS. 21 and 22. Note that the present sequence diagram is assumed to show a flow in the case where it was determined by the processing primary determination unit 302 that high speed processing is not possible.

In SQL data acquisition processing, the application unit 400 passes to the interface unit 301 an SQL command requesting data acquisition (read) (S701). The interface unit 301 that has received this SQL command passes this SQL command to the processing primary determination unit 302 (S702). The processing primary determination unit 302 that has received this SQL command determines that high speed processing is not possible and passes this SQL command to the client side transmitting/receiving unit 306 (S703).

The client side transmitting/receiving unit 306 transmits this SQL command to the server side transmitting/receiving unit 201 of the database server 200 (S704). The server side transmitting/receiving unit 201 that has received the SQL command passes this SQL command to the SQL term interpretation unit 202 (S705). The SQL term interpretation unit 202 that has received this SQL command executes term interpretation of an SQL text (S706).

The SQL term interpretation unit 202 that has executed term interpretation of the SQL command passes an interpretation result to the SQL command execution unit 203 (S707).

The SQL command execution unit 203 requests to the schema information management unit 205 table schema information of the table specified by the SQL command (S708). In the case that said table schema information is stored within the database server 200, the schema information management unit 205 returns said table schema information to the SQL command execution unit 203 (S709).

The SQL command execution unit 203 that has acquired the table schema information passes data (Key and Value) included in the SQL command, to the KVS data processing unit 206 (S710).

The KVS data processing unit 206 that has received the data accesses the cache memory 207 or the storage 208 and requests to the cache memory 207 or the storage 208 a data read of the serialized data (S711). The cache memory 207 or the storage 208 passes an execution result of the requested read of data (including the read data) to the KVS data processing unit 206 (S712).

The KVS data processing unit 206 passes the data acquired from the cache memory 207 or the storage 208 to the SQL command execution unit 203 (S713).

The SQL command execution unit 203 that has received the data passes this data, along with the table schema information acquired in steps S708 and S709, to the server side serialization processing unit 204 (S714).

The server side serialization processing unit 204 that has received the data (Key and Value) and the table schema information deserializes the data and returns the deserialized data to the SQL command execution unit 203 (S715).

The SQL command execution unit 203 that has received the deserialized data passes the execution result including the deserialized data to the SQL term interpretation unit 202 (S716). The SQL term interpretation unit 202 that has received the execution result passes this execution result to the server side transmitting/receiving unit 201 (S717). The server side transmitting/receiving unit 201 transmits this execution result to the client side transmitting/receiving unit 306 of the database client 300 (S718).

The client side transmitting/receiving unit 306 that has received the execution result passes this execution result to the application unit 400 via, sequentially, the processing primary determination unit 302 and the interface unit 301 (S719, S720, and S721).

That concludes description of the sequence diagram of the SQL data acquisition processing shown in FIG. 23.

3. EXAMPLES OF STATEMENT

Examples of statement passed from the application unit 400 to the database client 300 will be shown.

(1) An example of statement causing table schema information creation (registration) to be performed is as follows.
SQL: CREATE TABLE table name (key, value1, . . . );
(2) Examples of statement causing data registration to be performed are as follows.
Note that data registration is executable using either of SQL and KVS-API.
SQL: INSERT INTO table name VALUES (aa, bb, . . . );
KVS-API: set (table name, key, value1, value2, . . . );
  put (table name, key, value1, value2, . . . );
(3) Examples of statement causing data acquisition to be performed are as follows.
Note that data acquisition is executable using either of SQL and KVS-API.
SQL: SELECT column name FROM table name WHERE condition;
KVS-API: get (table name, key, *value1, *value2, . . . );
(4) Examples of statement causing data deletion to be performed are as follows.
Note that data deletion is executable using either of SQL and KVS-API.
SQL: DELETE FROM table name WHERE condition;
KVS-API: delete (table name, key);

4. SECOND EMBODIMENT

A second embodiment will be described. The second embodiment of the present invention is proposed as a database device. This database device is a device that comprises a plurality of data manipulation means, namely, an SQL and a KVS-API, solves a problem of the SQL that speed is slow by the KVS-API, and can manipulate also by the SQL which is frequently used in existing applications.

The database device according to the second embodiment is an information processing device such as a computer, a work station, a server, and so on, and this information processing device is a device provided with an arithmetic processing unit (CPU), a main memory (RAM), a read only memory (ROM), an input/output device (I/O), and when necessary an external memory device such as a hard disk device, and so on.

Figure 24:
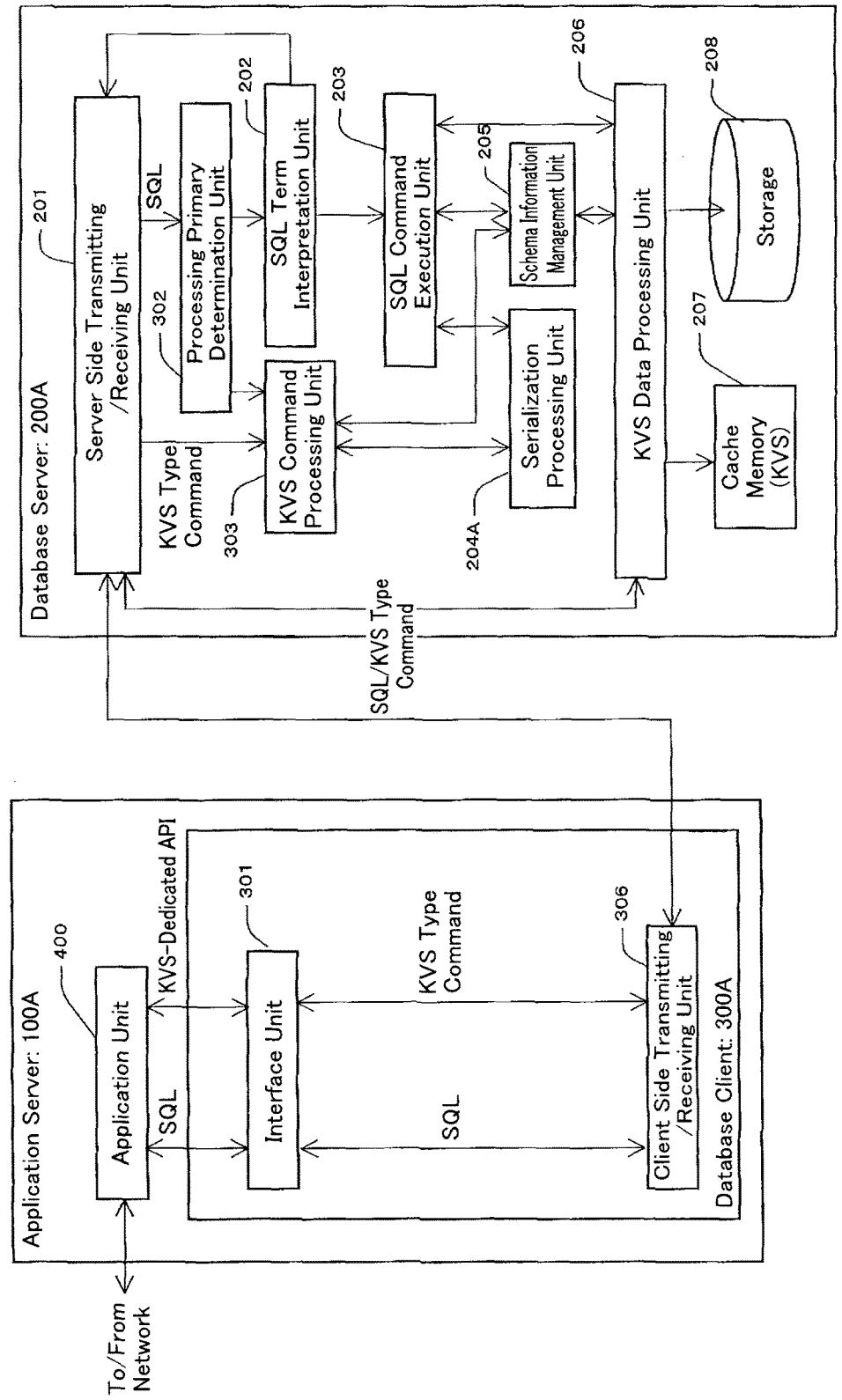
FIG. 24 is a functional block diagram showing a configuration example of a database device according to a second embodiment.

FIG. 24 displays a functional block diagram showing a configuration example of a database device 10 according to the second embodiment. Note that configuration elements identical to those of the database device according to the first embodiment are assigned with reference symbols identical to those assigned in the first embodiment, and a detailed description of those configuration elements will be omitted.

The database device according to the embodiment of the present invention includes an application server 100A and a database server 200A connected to the application server 100A. The application server 100A is connected to a network 20 and is capable of communication with a terminal device 30 via the network 20.

[4.1. Application Server]

The application server 100A utilizes a database provided by the database server 200A to function providing a service to the terminal device 30.

The application server 100A includes an application unit 400 and a database client 300A connected to the application unit 400.

[4.1.1. Database Client]

A configuration example of the database client 300A will be described with reference to FIG. 24. The database client 300A includes: an interface unit 301; and a client side transmitting/receiving unit 306 connected to the interface unit 301. Note that the interface unit 301 is connected to the application unit 400, and the client side transmitting/receiving unit 306 is connected to a server side transmitting/receiving unit 201.

[4.2. Database Server]

The database server 200A includes: the server side transmitting/receiving unit 201; a processing primary determination unit 302 and a KVS type command processing unit 303 that are connected to the server side transmitting/receiving unit 201; an SQL term interpretation unit 202 that is connected to the processing primary determination unit 302; an SQL command execution unit 203 that is connected to the SQL term interpretation unit 202; a KVS data processing unit 206, a server side serialization processing unit 204A, and a schema information management unit 205 that are connected to the SQL command execution unit 203; and a cache memory 207 and a storage 208 that are connected to the KVS data processing unit 206.

The KVS type command processing unit 303, as well as being connected to the processing primary determination unit 302, is also connected to the server side serialization processing unit 204A and the schema information management unit 205. The KVS data processing unit 206 and the SQL command execution unit 203 are connected to the server side transmitting/receiving unit 201. The server side transmitting/receiving unit 201 is connected to the client side transmitting/receiving unit 306.

The database device according to the second embodiment differs from that of the first embodiment in that the processing primary determination unit 302 and the KVS type command processing unit 303 that were provided to the database client 300 in the first embodiment are provided to the database server 200, and the server side serialization processing unit 204 in the first embodiment is substituted by the serialization processing unit 204A having functions of both of the client side serialization processing unit 304 and the server side serialization processing unit 204 of the first embodiment. Other configurations and functions of each of configuration elements are similar to in the first embodiment.

The database device according to the second embodiment has a feature that serialization or deserialization are performed in the database server 200A. This feature renders unnecessary a schema information change notification to each database client 300A connected to the database server 200A, and enables a reduction in processing load and an increased speed of processing time.

5. ADVANTAGES

The above-described first and second embodiments can carry out manipulation of a KVS-API database, hence make it possible to perform processing at high speed, and can also carry out manipulation of a database by an SQL, hence enable data acquisition under a variety of conditions and moreover, make it possible for existing applications using SQL text to be used unchanged.

In addition, the above-described first and second embodiments provide table schema information to a database side and perform serialization or deserialization on the database side, not on an application side, thereby facilitating a change in table structure.

Moreover, the above-described first and second embodiments enable appropriate use of KVS-API and SQL to be made, for the same data.

6. SUMMARY, OTHERS

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A database device, comprising:
a storage device that stores data by a database system in which index data and actual data are stored in a pair;
a data processing device that upon receiving a first command described in a first database language which is a database language for the database system in which index data and actual data are stored in a pair, manipulates data stored in the storage device based on the first command;
a second command execution device that upon receiving a second command described in a second database language which is a database language different from the first database language, serializes this second command, generates data configured from index data and actual data, and passes this data to the data processing device;
a first command processing device that upon receiving the first command described in the first database language, serializes the first command, generates data configured from index data and actual data, and transmits this data to the data processing device;
an interface device that upon receiving the first command described in the first database language from an application, passes this first command to the first command processing device, and upon receiving the second command described in the second database language, transmits the second command to the second command execution device; and
a determination device that upon receiving the second command from the interface device, determines whether the second command is processable by the first command processing device or not, and in the case of determining the second command to be processable, passes the second command to the first command processing device.

2. The database device according to claim 1, wherein the first database language is a Key Value Store-Application Programming Interface (KVS-API), and the second database language is a Structured Query Language (SQL).

3. The database device according to claim 1, wherein a rewriting rule employed in which the second command execution device serializes the second command and a rewriting rule employed in which the first command processing device serializes the first command are same.

4. The database device according to claim 1, wherein the data processing device and the second command execution device are included in the storage device.

5. The database device according to claim 1, wherein the data processing device, the second command execution device, and the first command processing device are included in the storage device.

* * * * *